United States Patent
Jeon

(10) Patent No.: US 10,507,363 B2
(45) Date of Patent: Dec. 17, 2019

(54) METALLIC MONOMER USED AS IONOMERIC ADDITIVES FOR IONOMERS AND POLYOLEFINS

(71) Applicant: Taylor Made Golf Company, Inc., Carlsbad, CA (US)

(72) Inventor: Hong G. Jeon, Carlsbad, CA (US)

(73) Assignee: Taylor Made Golf Company, Inc., Carlsbad, CA (US)

( * ) Notice: Subject to any disclaimer, the term of this patent is extended or adjusted under 35 U.S.C. 154(b) by 120 days.

(21) Appl. No.: 15/175,961

(22) Filed: Jun. 7, 2016

(65) Prior Publication Data

US 2016/0354645 A1    Dec. 8, 2016

Related U.S. Application Data

(60) Provisional application No. 62/172,707, filed on Jun. 8, 2015.

(51) Int. Cl.
| | |
|---|---|
| A63B 37/00 | (2006.01) |
| C08K 5/098 | (2006.01) |
| B32B 27/32 | (2006.01) |
| B29C 39/00 | (2006.01) |
| B29L 31/54 | (2006.01) |
| B29C 45/14 | (2006.01) |
| B29C 45/16 | (2006.01) |
| B29K 75/00 | (2006.01) |

(52) U.S. Cl.
CPC ...... *A63B 37/0075* (2013.01); *A63B 37/0024* (2013.01); *A63B 37/0039* (2013.01); *A63B 37/0074* (2013.01); *A63B 37/0076* (2013.01); *B29C 39/00* (2013.01); *B32B 27/32* (2013.01); *C08K 5/098* (2013.01); *B29C 45/14819* (2013.01); *B29C 45/1671* (2013.01); *B29K 2075/00* (2013.01); *B29L 2031/546* (2013.01)

(58) Field of Classification Search
None
See application file for complete search history.

(56) References Cited

U.S. PATENT DOCUMENTS

| | | | |
|---|---|---|---|
| 3,804,803 A | 4/1974 | Streck et al. | |
| 3,974,092 A | 8/1976 | Streck et al. | |
| 4,115,475 A | 9/1978 | Foy et al. | |
| 4,123,061 A | 10/1978 | Dusbiber | |
| 4,153,772 A | 5/1979 | Schwesig et al. | |
| 4,183,876 A | 1/1980 | Coran et al. | |
| 4,195,015 A | 3/1980 | Deleens et al. | |
| 4,230,838 A | 10/1980 | Foy et al. | |
| 4,331,786 A | 5/1982 | Foy et al. | |
| 4,332,920 A | 6/1982 | Foy et al. | |
| 4,546,980 A | 10/1985 | Gendreau et al. | |
| 4,726,590 A | 2/1988 | Molitor | |
| 4,728,693 A | 3/1988 | Droscher et al. | |
| 4,755,552 A | 7/1988 | Jadamus et al. | |
| 4,792,141 A | 12/1988 | Llort | |
| 4,838,556 A | 6/1989 | Sullivan | |
| 4,840,993 A | 6/1989 | Bartz | |
| 4,844,471 A | 7/1989 | Terence et al. | |
| 4,852,884 A | 8/1989 | Sullivan | |
| 4,894,411 A | 1/1990 | Okada et al. | |
| 4,950,826 A | 8/1990 | Zerpner et al. | |
| 4,955,966 A | 9/1990 | Yuki | |
| 5,306,760 A * | 4/1994 | Sullivan ................. | C08K 5/098 273/DIG. 22 |
| 5,334,673 A | 8/1994 | Wu | |
| 5,385,776 A | 1/1995 | Maxfield et al. | |
| 5,436,295 A | 7/1995 | Nishikawa et al. | |
| 5,460,367 A | 10/1995 | Horiuchi | |
| 5,830,087 A * | 11/1998 | Sullivan ............. | A63B 37/0003 473/385 |
| 5,948,862 A | 9/1999 | Sano et al. | |
| 5,959,059 A | 9/1999 | Vedula et al. | |
| 5,962,553 A | 10/1999 | Ellsworth | |
| 6,012,991 A | 1/2000 | Kim et al. | |
| 6,018,003 A * | 1/2000 | Sullivan ............. | A63B 37/0003 473/371 |
| 6,100,321 A | 8/2000 | Chen | |
| 6,180,722 B1 | 1/2001 | Dalton et al. | |
| 6,268,437 B1 * | 7/2001 | Takesue ............. | A63B 37/0003 473/365 |
| 6,303,704 B1 * | 10/2001 | Nesbitt ............. | A63B 37/0003 525/263 |
| 6,329,458 B1 | 12/2001 | Takesu et al. | |
| 6,426,387 B1 | 7/2002 | Kim | |

(Continued)

FOREIGN PATENT DOCUMENTS

| | | |
|---|---|---|
| JP | 62267357 | 11/1987 |
| JP | 63221157 | 9/1998 |

(Continued)

OTHER PUBLICATIONS

Chemical Book entry for Zinc Acrylate (2017). (Year: 2017).*

(Continued)

*Primary Examiner* — David J Buttner
(74) *Attorney, Agent, or Firm* — Klarquist Sparkman, LLP

(57) ABSTRACT

A golf ball comprising:
(a) a core:
(b) an outer cover layer; and
(c) optionally, at least one intermediate layer,
wherein at least the outer cover layer or the intermediate layer comprises a blend composition of:
(i) a metallic coagent; and
(ii)(a) at least one polyolefin or (ii)(b) at least one ionomer.

15 Claims, 2 Drawing Sheets

(56) References Cited

U.S. PATENT DOCUMENTS

| | | |
|---|---|---|
| 6,435,986 B1 | 8/2002 | Wu et al. |
| 6,476,176 B1 | 11/2002 | Wu |
| 6,485,378 B1 | 11/2002 | Boehm |
| 6,508,724 B2 | 1/2003 | Dalton |
| 6,562,906 B2 | 5/2003 | Chen |
| 6,569,037 B2 | 5/2003 | Ichikawa et al. |
| 6,582,326 B2 | 6/2003 | Wu et al. |
| 6,616,552 B2 | 9/2003 | Takesue et al. |
| 6,635,716 B2 | 10/2003 | Voorheis et al. |
| 6,692,379 B2 | 2/2004 | Morgan et al. |
| 6,762,244 B2 | 7/2004 | Rajagopalan et al. |
| 6,770,360 B2 | 8/2004 | Mientus et al. |
| 6,776,942 B2 | 8/2004 | Kim |
| 6,794,447 B1 | 9/2004 | Kim et al. |
| 6,812,276 B2 | 11/2004 | Yeager |
| 6,835,146 B2 | 12/2004 | Jordan et al. |
| 6,861,474 B2 | 3/2005 | Kim |
| 6,878,075 B2 | 4/2005 | Kim |
| 6,905,423 B2 | 6/2005 | Morgan et al. |
| 6,930,150 B2 | 8/2005 | Kim |
| 6,960,629 B2 | 11/2005 | Voorheis et al. |
| 7,041,769 B2 | 5/2006 | Wu et al. |
| 7,528,196 B2 | 5/2009 | Kim |
| 7,879,937 B2 * | 2/2011 | Shindo ............... A63B 37/0003 473/371 |
| 8,563,641 B2 | 10/2013 | Khabashesku |
| 8,785,561 B2 | 7/2014 | Kim |
| 2001/0005699 A1 | 6/2001 | Morgan et al. |
| 2001/0019971 A1 | 9/2001 | Hayashi et al. |
| 2002/0040111 A1 | 4/2002 | Rajagopalan |
| 2002/0045499 A1 | 4/2002 | Takemura et al. |
| 2003/0119989 A1 | 6/2003 | Ladd et al. |
| 2003/0158312 A1 | 8/2003 | Chen |
| 2003/0224871 A1 | 12/2003 | Kim et al. |
| 2004/0019138 A1 | 1/2004 | Voorheis et al. |
| 2004/0082408 A1 | 4/2004 | Sullivan et al. |
| 2004/0092336 A1 | 5/2004 | Kim et al. |
| 2004/0209708 A1 | 10/2004 | Bulpett et al. |
| 2004/0236030 A1 | 11/2004 | Kim et al. |
| 2005/0059756 A1 | 3/2005 | Kim et al. |
| 2006/0281585 A1 * | 12/2006 | Jordan ............... A63B 37/0023 473/371 |
| 2008/0090678 A1 | 4/2008 | Kim et al. |
| 2010/0248862 A1 * | 9/2010 | Sullivan ............. A63B 37/0039 473/373 |
| 2011/0105248 A1 * | 5/2011 | Shigemitsu ........ A63B 37/0003 473/385 |
| 2013/0053496 A1 * | 2/2013 | Austin ................ C08K 5/0091 524/396 |
| 2014/0274470 A1 | 9/2014 | Kim et al. |
| 2014/0315658 A1 | 10/2014 | Kim et al. |

FOREIGN PATENT DOCUMENTS

| | | |
|---|---|---|
| JP | 2001-218872 | 8/2001 |
| JP | 2002-65896 | 3/2002 |

OTHER PUBLICATIONS

U.S. Appl. No. 10/926,509, filed Aug. 25, 2004, Kim et al.
"National Metrology Laboratory News," *CSIR: National Metrology Laboratory*, 3(14): Jul. 11, 2002, 4 pages.
BP Petrochemicals, "Aromatics and Acetyls," accessed at http://bppetrochemicals.com on Nov. 1, 2006.
E.I. du Pont de Nemours & Co., "Research Disclosure: Articles based on ionomers derived from ethylene/acrylic or meth-acrylic acid with greater than 15% acid," Jan. 1989, 2 pages.
English translation of Notice of Reasons for Rejection dispatched from the Japan Patent Office on Oct. 22, 2008, issued in Japanese Patent Application No. 2006-014614.
English translation of Notice of Reasons for Rejection dispatched from the Japan Patent Office on Jan. 16, 2008, issued in Japanese Patent Application No. 2006-014614.
http://chemsoc.org/chembytes/ezine/2002/birkett_july02.htm accessed on Nov. 1, 2006.

* cited by examiner ic MONOMER USED AS
IONOMERIC ADDITIVES FOR IONOMERS
AND POLYOLEFINS This application claims the benefit of U.S. Provisional Application No. 62/172,707, filed Jun. 8, 2015, the entirety of which is incorporated by reference herein.

BACKGROUND

The present invention relates to golf balls comprising a particular composition suitable for use in golf ball manufacture. In one embodiment, the present invention is used in the manufacture of a golf ball comprising a core, a cover layer and, one or more intermediate layers. In one preferred embodiment, a golf ball is disclosed in which at least one intermediate layer or cover layer comprises the novel composition of the present invention.

SUMMARY

Disclosed herein is a golf ball comprising:
(a) a core:
(b) an outer cover layer; and
(c) optionally, at least one intermediate layer,
wherein at least the outer cover layer or the intermediate layer comprises a blend composition of:
(i) a metallic coagent; and
(ii)(a) at least one polyolefin or (ii)(b) at least one ionomer.

Also disclosed herein is a golf ball comprising:
(a) a core:
(b) an outer cover layer; and
(c) optionally, at least one intermediate layer,
wherein at least the outer cover layer or the intermediate layer comprises a blend composition made by contacting a metallic coagent with a non-neutralized copolymeric or terpolymeric olefin-containing acid to produce an ionomeric resin.

Further disclosed herein is a golf ball comprising:
(a) a core:
(b) an outer cover layer; and
(c) optionally, at least one intermediate layer,
wherein at least the outer cover layer or the intermediate layer comprises a blend composition made by contacting a metallic coagent with a partially or fully neutralized copolymeric or terpolymeric ionomer.

Additionally disclosed herein is a golf ball comprising:
(a) a core:
(b) an outer cover layer; and
(c) optionally, at least one intermediate layer,
wherein at least the outer cover layer or the intermediate layer comprises a blend composition made by (i) blending a non-neutralized copolymeric or terpolymeric olefin-containing acid with a block copolymer, followed by partial or full neutralization of acid groups with a metal cation salt to produce a partially or fully neutralized ionomeric resin, and (ii) contacting a metallic coagent with the resulting partially or fully neutralized ionomeric resin.

Further disclosed herein is a golf ball comprising:
(a) a core:
(b) an outer cover layer; and
(c) optionally, at least one intermediate layer,
wherein at least the outer cover layer or the intermediate layer comprises a blend composition made by (i) blending a partially or fully neutralized ionomeric resin with a block copolymer to produce an ionomer/block copolymer blend, and (ii) subsequently adding a metallic agent to the resulting ionomer/block copolymer blend.

Also disclosed herein is a golf ball comprising:
(a) a core:
(b) an outer cover layer; and
(c) optionally, at least one intermediate layer,
wherein at least the outer cover layer or the intermediate layer comprises a blend composition made by contacting a metallic coagent with a polyolefin.

The foregoing will become more apparent from the following detailed description, which proceeds with reference to the accompanying figures.

BRIEF DESCRIPTION OF THE DRAWINGS

Although FIGS. 1 and 2 illustrate only three- and four-piece golf ball constructions, golf balls of the present invention may comprise from 1 to at least 5 intermediate layer(s), preferably from 1 to 3 intermediate layer(s), more preferably from 1 to 2 intermediate layer(s).

DETAILED DESCRIPTION

Figure 1:
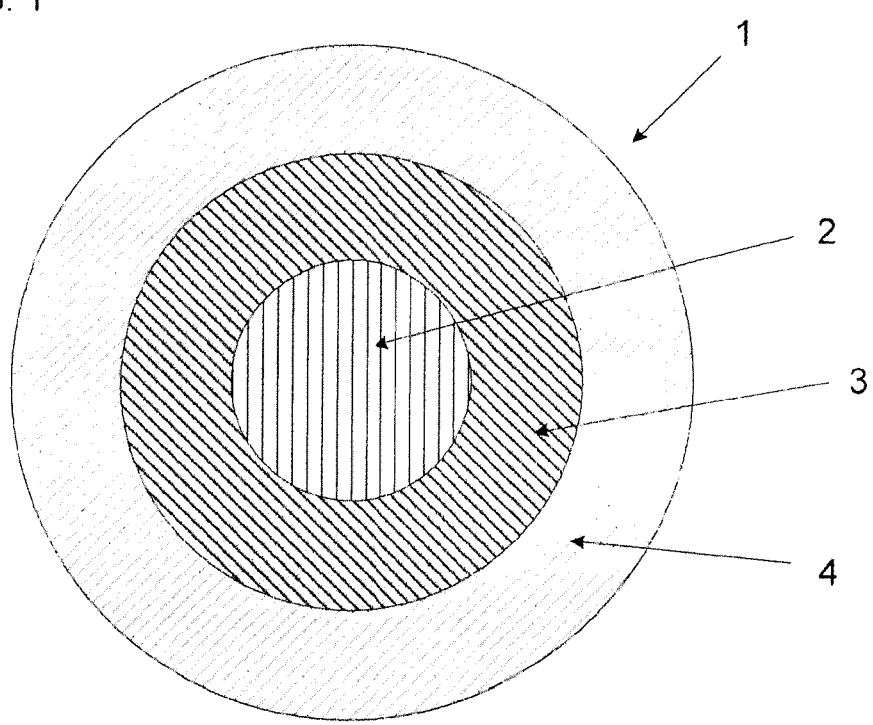
FIG. 1 illustrates a three-piece golf ball 1 comprising a solid center or core 2, an intermediate layer 3, and an outer cover layer 4.
Figure 2:
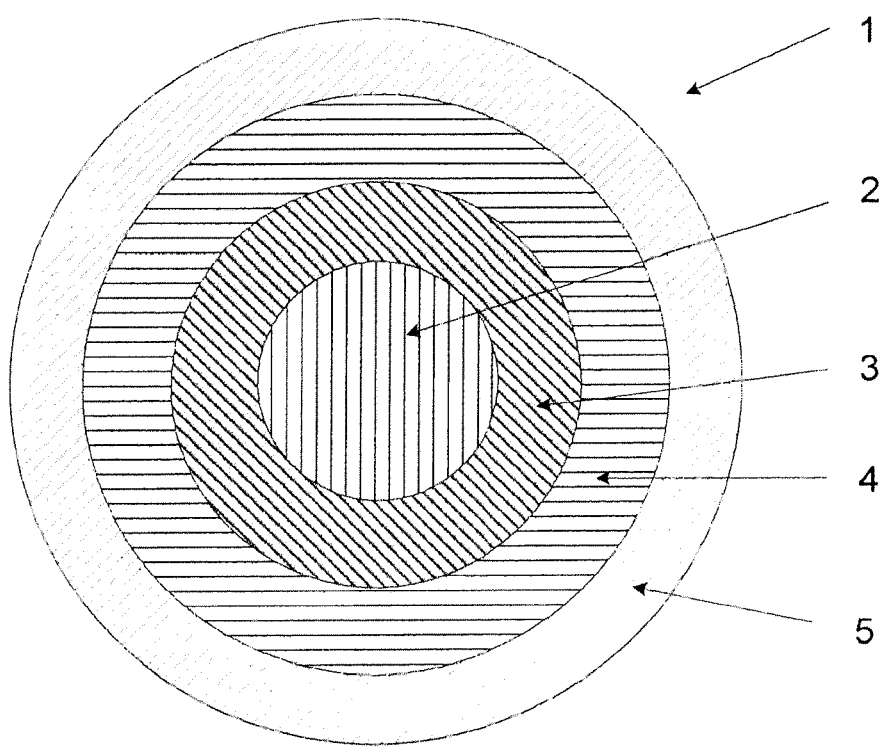
FIG. 2 illustrates a four-piece golf ball 1 comprising a core 2, and an outer cover layer 5, an inner intermediate layer 3, and an outer intermediate layer 4.

Any numerical values recited herein include all values from the lower value to the upper value in increments of one unit provided that there is a separation of at least 2 units between any lower value and any higher value. As an example, if it is stated that the amount of a component or a value of a process variable is from 1 to 90, preferably from 20 to 80, more preferably from 30 to 70, it is intended that values such as 15 to 85, 22 to 68, 43 to 51, 30 to 32 etc. are expressly enumerated in this specification. For values, which have less than one unit difference, one unit is considered to be 0.1, 0.01, 0.001, or 0.0001 as appropriate. Thus all possible combinations of numerical values between the lowest value and the highest value enumerated herein are said to be expressly stated in this application.

The term "bimodal polymer" refers to a polymer comprising two main fractions and more specifically to the form of the polymers molecular weight distribution curve, i.e., the appearance of the graph of the polymer weight fraction as function of its molecular weight. When the molecular weight distribution curves from these fractions are superimposed into the molecular weight distribution curve for the total resulting polymer product, that curve will show two maxima or at least be distinctly broadened in comparison with the curves for the individual fractions. Such a polymer product is called bimodal. It is to be noted here that also the chemical compositions of the two fractions may be different.

As used herein, the term "block copolymer" is intended to mean a polymer comprising two or more homopolymer subunits linked by covalent bonds. The union of the homopolymer subunits may require an intermediate non-repeating subunit, known as a junction block. Block copolymers with two or three distinct blocks are called diblock copolymers and triblock copolymers, respectively.

The term "core" is intended to mean the elastic center of a golf ball. The core may be a unitary core having a center it may have one or more "core layers" of elastic material, which are usually made of rubbery material such as diene rubbers.

The term "cover layer" is intended to mean the outermost layer of the golf ball; this is the layer that is directly in contact with paint and/or ink on the surface of the golf ball. If the cover consists of two or more layers, only the outermost layer is designated the cover layer, and the remaining layers (excluding the outermost layer) are commonly designated intermediate layers as herein defined. The term "outer cover layer" as used herein is used interchangeably with the term "cover layer."

The term "fiber" as used herein is a general term for which the definition given in *Engineered Materials Handbook*, Vol. 2, "Engineering Plastics", published by A.S.M. International, Metals Park, Ohio, USA, is relied upon to refer to filamentary materials with a finite length that is at least 100 times its diameter, which is typically 0.10 to 0.13 mm (0.004 to 0.005 in.). Fibers can be continuous or specific short lengths (discontinuous), normally no less than 3.2 mm (⅛ in.). Although fibers according to this definition are preferred, fiber segments, i.e., parts of fibers having lengths less than the aforementioned are also considered to be encompassed by the invention. Thus, the terms "fibers" and "fiber segments" are used herein. In the claims appearing at the end of this disclosure in particular, the expression "fibers or fiber segments" and "fiber elements" are used to encompass both fibers and fiber segments.

The term "hydrocarbyl" is intended to mean any aliphatic, cycloaliphatic, aromatic, aryl substituted aliphatic, aryl substituted cycloaliphatic, aliphatic substituted aromatic, or cycloaliphatic substituted aromatic groups. The aliphatic or cycloaliphatic groups are preferably saturated. Likewise, the term "hydrocarbyloxy" means a hydrocarbyl group having an oxygen linkage between it and the carbon atom to which it is attached.

The term "carboxy group" is intended to mean any group containing a carbon atom that is linked by a double bond to one oxygen atom and by one single bond to another carbon atom and by another single bond to an oxygen, nitrogen, sulfur, or another carboxy carbon. One suitable carboxy group contained in the carboxylated elastomers used in the present invention may be represented by the general formula —COOR, wherein R may be a hydrogen, a metal (for example, an alkali metal, an alkaline earth metal, or a transition metal), an ammonium or a quaternary ammonium group, an acyl group (for example acetyl ($CH_3C(O)$) group), an alkyl group (such as an ester), an acid anhydride group, and combinations thereof. Examples of suitable carboxy groups include, but are not limited to, carboxylic acid, carboxy esters, carboxy acid anhydrides, and monovalent, divalent and trivalent metal salts of carboxy acids, derivatives thereof and any and combinations thereof.

The term "mantle layer" may be used interchangeably herein with the terms "intermediate layer" and is intended to mean any layer(s) in a golf ball disposed between the core and the outer cover layer. Should a ball have more than one mantle layer, these may be distinguished as "inner intermediate layer" or "inner mantle layer" which terms may be used interchangeably to refer to the intermediate layer nearest the core and furthest from the outer cover, as opposed to the "outer intermediate layer" or "outer mantle layer" which terms may also used interchangeably to refer to the intermediate layer furthest from the core and closest to the outer cover, and if there are three intermediate layers, these may be distinguished as "inner intermediate layer" or "inner mantle layer" which terms are used interchangeably to refer to the intermediate or mantle layer nearest the core and furthest from the outer cover, as opposed to the "outer intermediate layer" or "outer mantle layer" which terms are also used interchangeably to refer to the intermediate layer further from the core and closer to the outer cover, and as opposed to the "intermediate layer" or "intermediate mantle layer" which terms are also used interchangeably to refer to the intermediate layer between the inner intermediate layer and the outer intermediate layer.

The term "(meth)acrylic acid copolymers" is intended to mean copolymers of methacrylic acid and/or acrylic acid.

The term "(meth)acrylate" is intended to mean an ester of methacrylic acid and/or acrylic acid.

The term "partially neutralized" is intended to mean an ionomer with a degree of neutralization of less than 100 percent. The term "highly neutralized" is intended to mean an ionomer with a degree of neutralization of greater than 50 percent. The term "fully neutralized" is intended to mean an ionomer with a degree of neutralization of 100 percent.

The term "prepolymer" as used herein is intended to mean any polymeric material that can be further processed to form a final polymer material of a manufactured golf ball, such as, by way of example and not limitation, a polymerized or partially polymerized material that can undergo additional processing, such as crosslinking.

The term "thermoplastic" as used herein is intended to mean a material that is capable of softening or melting when heated and of hardening again when cooled. Thermoplastic polymer chains often are not cross-linked or are lightly crosslinked using a chain extender, but the term "thermoplastic" as used herein may refer to materials that initially act as thermoplastics, such as during an initial extrusion process or injection molding process, but which also may be crosslinked, such as during a compression molding step to form a final structure.

The term "thermoset" as used herein is intended to mean a material that crosslinks or cures via interaction with as crosslinking or curing agent. Crosslinking may be induced by energy, such as heat (generally above 200° C.), through a chemical reaction (by reaction with a curing agent), or by irradiation. The resulting composition remains rigid when set, and does not soften with heating. Thermosets have this property because the long-chain polymer molecules cross-link with each other to give a rigid structure. A thermoset material cannot be melted and re-molded after it is cured. Thus thermosets do not lend themselves to recycling unlike thermoplastics, which can be melted and re-molded.

The term "thermoplastic polyurethane" as used herein is intended to mean a material prepared by reaction of a prepared by reaction of a diisocyanate with a polyol, and optionally addition of a chain extender.

The term "thermoplastic polyurea" as used herein is intended to mean a material prepared by reaction of a prepared by reaction of a diisocyanate with a polyamine, with optionally addition of a chain extender.

The term "thermoset polyurethane" as used herein is intended to mean a material prepared by reaction of a diisocyanate with a polyol (or a prepolymer of the two), and a curing agent.

The term "thermoset polyurea" as used herein is intended to mean a material prepared by reaction of a diisocyanate with a polyamine (or a prepolymer of the two) and a curing agent.

The term "unimodal polymer" refers to a polymer comprising one main fraction and more specifically to the form of the polymers molecular weight distribution curve, i.e., the molecular weight distribution curve for the total polymer product shows only a single maximum.

The term "urethane prepolymer" as used herein is intended to mean the reaction product of diisocyanate and a polyol.

The term "urea prepolymer" as used herein is intended to mean the reaction product of a diisocyanate and a polyamine.

The term "zwitterion" as used herein is intended to mean a form of the compound having both an amine group and carboxylic acid group, where both are charged and where the net charge on the compound is neutral.

The present invention can be used in forming golf balls of any desired size. "The Rules of Golf" by the USGA dictate that the size of a competition golf ball must be at least 1.680 inches in diameter; however, golf balls of any size can be used for leisure golf play. The preferred diameter of the golf balls is from about 1.680 inches to about 1.800 inches. The more preferred diameter is from about 1.680 inches to about 1.760 inches. A diameter of from about 1.680 inches to about 1.740 inches is most preferred; however diameters anywhere in the range of from 1.70 to about 2.0 inches can be used. Oversize golf balls with diameters above about 1.760 inches to as big as 2.75 inches are also within the scope of the invention.

Disclosed herein is a blend composition of: (i) a metallic coagent; and (ii)(a) at least one polyolefin or (ii)(b) at least one ionomer. As used herein, a "blend" or "blend composition" can be a physical mixture of components A and B and/or a reaction product produced by a reaction between components A and B. The blend composition may be used to make at least one intermediate layer or cover layer of a golf ball. In certain embodiment, the blend composition is included in a single intermediate layer. In certain embodiments, the blend composition is included in a cover layer.

In several embodiments, the compositions and methods disclosed herein increase flex modulus and elasticity for ionomers. For example, high-acid ionomer shows excellent mechanical properties and elasticity but are brittle compared to mid-acid ionomer. Mid-acid ionomers used in an intermediate layer show excellent impact durability but are not as stiff as high-acid ionomers. A high-acid ionomer generally includes more than about 16% weight of a carboxylic acid, preferably from about 17% to about 25% by weight of a carboxylic acid, more preferably from about 19% to about 21% by weight of a carboxylic acid. A mid-acid ionomer, generally includes more than about 11% weight of a carboxylic acid, preferably from about 12% to about 16% by weight of a carboxylic acid, more preferably from about 15% to about 16% by weight of a carboxylic acid. Adding a metallic coagent into a mid-acid ionomer may increasing the stiffness while maintaining impact durability. For example, the metallic coagent may reinforce existing ionic clusters. Adding a metallic coagent into a high-acid ionomer may also increase the mechanical properties of the high-acid ionomer, but at the cost of increased brittleness.

In several embodiments, the compositions and methods disclosed herein form ionic groups in polyolefins by incorporating metallic monomer into the polyolefins. Thus, ionomeric properties can be achieved for any polyolefin. Incorporation of ionomeric properties into polyolefins can improve mechanical properties, especially elasticity, of the polyolefin. In certain embodiments, the metallic coagent form ionomeric 'cross-links' between polymer chains. The ionomeric 'cross-links' are physical crosslinks so that above 150° C. they dissociate and do not adversely affect flowability of the material. Below 150° C., the crosslinks re-form and provide significant property enhancement. This compositions and methods disclosed herein do not require an acid group in the polymer chain, and no neutralization step is required.

Certain embodiments of the blend composition are described below:

(1) In several embodiments, the blend composition can be made by introducing the metallic coagent into a non-neutralized copolymeric or terpolymeric olefin-containing acid to produce an ionomeric resin. The metallic coagent (e.g., zinc cinnamate) does not induce a neutralization reaction. Although not bound by any theory, it is believed that the metallic coagent forms discrete ionic clusters in between the polymer backbone chains thus making an ionomeric resin. The copolymeric or terpolymeric olefin-containing acid may be any polymer that incorporates at least one type of an acidic functional group. Illustrative polymers include, but are not limited to, ethylene/(meth)acrylic acid copolymers and ethylene/(meth)acrylic acid/alkyl (meth)acrylate terpolymers, or ethylene and/or propylene maleic anhydride copolymers and terpolymers. Examples of such polymers which are commercially available include, but are not limited to, the Escor® 5000, 5001, 5020, 5050, 5070, 5100, 5110 and 5200 series of ethylene-acrylic acid copolymers sold by Exxon Mobil, the PRIMACOR® 1321, 1410, 1410-XT, 1420, 1430, 2912, 3150, 3330, 3340, 3440, 3460, 4311, 4608 and 5980 series of ethylene-acrylic acid copolymers sold by The Dow Chemical Company, Midland, Mich. and the ethylene-methacrylic acid copolymers such as Nucrel 599, 699, 0903, 0910, 925, 960, 2806, and 2906, sold by DuPont.

(2) In several embodiments, the blend composition can be made by introducing the metallic coagent into a partially or fully neutralized copolymeric or terpolymeric olefin-containing acid to further neutralize and reinforce the ionomeric resin. In other words, the metallic reagent is added to a pre-formed ionomer resin. The metallic coagent (e.g., zinc cinnamate) does not induce a neutralization reaction. Although not bound by any theory, it is believed that the metallic coagent forms discrete ionic clusters in between the polymer backbone chains thus making an ionomeric resin.

(3) In several embodiments, the above-described ionomer resin (1) or (2) may be blended with a block copolymer, preferably styrenic block copolymer, having at least one block A comprising an aromatic vinyl compound and at least one polymer block B comprising a hydrogenated diene compound, and with or without having a hydroxyl group at the terminal of the block copolymer. Illustrative block copolymers include block copolymers including di and triblock copolymers, incorporating a first polymer block having an aromatic vinyl compound, and a second polymer block having an olefinic and/or conjugated diene compound. Preferred aromatic vinyl compounds include styrene, α-methylstyrene, o-, m- or p-methylstyrene, 4-propylstyrene, 1,3-dimethylstyrene, vinylnaphthalene and vinylanthracene. In particular, styrene and α-methylstyrene are preferred. These aromatic vinyl compounds can each be used alone, or can be used in combination of two or more kinds. The aromatic vinyl compound is preferably contained in the block copolymer (b) in an amount of from 5 to 75% by weight, and more preferably from 10 to 65% by weight.

The conjugated diene compound, that constitutes the polymer block B in the block copolymer (b), includes, e.g., 1,3-butadiene, isoprene, 2,3-diemthyl-1,3-butadiene, 1,3-pentadiene and 1,3-hexadiene. In particular, isoprene and 1,3-butadiene are preferred. These conjugated diene compounds can each be used alone, or can be used in combination of two or more kinds. Preferred block copolymers include the styrenic block copolymers such as styrene-butadiene-styrene (SBS), styrene-ethylene-butylene-styrene, (SEBS) and styrene-ethylene/propylene-styrene (SEPS). Commercial examples include SEPTON marketed by Kuraray Company of Kurashiki, Japan; TOPRENE by Kumho Petrochemical Co., Ltd and KRATON marketed by Kraton Polymers.

(4) In several embodiments, the above-described metallic-modified ionomer resin (1) may be partially or fully neutralized using various types of metal cation salts. The examples of metal cation salts are, but not limited to, acetate, oxide or hydroxide salts of lithium, calcium, zinc, sodium, potassium, magnesium, magnesium, nickel, manganese, or mixtures thereof.

(5) In several embodiments, a non-neutralized copolymeric or terpolymeric olefin-containing acid is blended with a block copolymer, preferably styrenic block copolymer, having at least one block A comprising an aromatic vinyl compound and at least one polymer block B comprising a hydrogenated diene compound, and with or without having a hydroxyl group at the terminal of the block copolymer, followed by partial or full neutralization of acid groups using various types of metal cation salts. The examples of metal cation salts are, but not limited to, acetate, oxide or hydroxide salts of lithium, calcium, zinc, sodium, potassium, magnesium, magnesium, nickel, manganese, or mixtures thereof. The result is a partially or fully neutralized resin. A metallic coagent is added to the resulting partially or fully neutralized resin.

(6) In several embodiments, a partially or fully neutralized resin is blended with a block copolymer, preferably styrenic block copolymer, having at least one block A comprising an aromatic vinyl compound and at least one polymer block B comprising a hydrogenated diene compound, and with or without having a hydroxyl group at the terminal of the block copolymer. A metallic coagent is added to the resulting resin/block copolymer blend.

(7) In several embodiments, a metallic coagent is introduced into a polyolefin (e.g., polyethylene, polypropylene, or polystyrene) or a polyolefin-containing blend. The metallic coagent (e.g., zinc cinnamate) does not induce a neutralization reaction. Although not bound by any theory, it is believed that the metallic coagent forms discrete ionic clusters in between the polymer backbone chains.

In several embodiments, the blend composition constitutes the majority component of an intermediate layer and/or cover layer. In particular, the blend composition, constitutes greater than 40 weight %, more preferably greater than 45 weight %, and most preferably greater than 50 weight %, of the total weight of the composition forming the intermediate and/or cover layer.

The polyolefin into which the metallic coagent is introduced may be a polymer that is made from at least one olefin monomer. The polyolefin comprising a polymeric backbone can represent, for example, the polyethylene family (LLDPE, LDPE, HDPE, etc.), polypropylene, and copolymers, among others. The term "polyolefin," as used herein, is meant to include the class or group of thermoplastic polymers derived from simple olefins, including polyethylene, polypropylene, polybutenes, polystyrenes, ethylene-propylene rubber, polybutene-1, polyisobutylene, cyclopolyolefins, polyisoprene and poly-a-olefins. The term also includes homopolymers, copolymers, grafted copolymers, and the like. Illustrative polyolefins include thermoplastic polyolefins such as polyethylene, polypropylene, polymethylpentene, polybutene, and polystyrene. Illustrative polyolefins also include elastomers such as polyisobutylene, ethylene-propylene copolymer, ethylene-propylene-diene terpolymer, polyisoprene, polychloroprene, polybutadiene, poly(styrene-co-butadiene), poly(4-methyl pentene-1), polycycloolefin (e.g., cyclobutene, cyclopentene, norbornene), and ethylene-vinyl acetate. Further illustrative polyolefins include olefinic thermoplastic elastomers such as, for example, metallocene-catalyzed polyolefins, ethylene-octene copolymer, ethylene-butene copolymer, and ethylene-propylene copolymers all with or without controlled tacticity as well as blends of polyolefins having ethyl-propylene-non-conjugated diene terpolymer, rubber-based copolymer, and dynamically vulcanized rubber-based copolymer. Examples of these include products sold under the trade names SANTOPRENE, DYTRON, VISAFLEX, and VYRAM by Advanced Elastomeric Systems of Houston, Tex., and SARLINK by DSM of Haarlen, the Netherlands.

In several embodiments, the metallic coagent may be introduced into a pre-formed ionomer resin. One family of such resins was developed in the mid-1960's, by E.I. DuPont de Nemours and Co., and sold under the trademark SURLYN®. Preparation of such ionomers is well known, for example see U.S. Pat. No. 3,264,272. Generally speaking, most commercial ionomers are unimodal and consist of a polymer of a mono-olefin, e.g., an alkene, with an unsaturated mono- or dicarboxylic acids having 3 to 12 carbon atoms. An additional monomer in the form of a mono- or dicarboxylic acid ester may also be incorporated in the formulation as a so-called "softening comonomer". The incorporated carboxylic acid groups are then neutralized by a basic metal ion salt, to form the ionomer. The metal cations of the basic metal ion salt used for neutralization include $Li^+$, $Na^+$, $K^+$, $Zn^{2+}$, $Ca^{2+}$, $Co^{2+}$, $Ni^{2+}$, $Cu^{2+}$, $Pb^{2+}$, and $Mg^{2+}$, with the $Li^+$, $Na^+$, $Ca^{2+}$, $Zn^{2+}$, and $Mg^{2+}$ being preferred. The basic metal ion salts include those of for example formic acid, acetic acid, nitric acid, and carbonic acid, hydrogen carbonate salts, oxides, hydroxides, and alkoxides.

Today, there are a wide variety of commercially available ionomer resins based both on copolymers of ethylene and (meth)acrylic acid or terpolymers of ethylene and (meth)acrylic acid and (meth)acrylate, all of which can be used as a golf ball component. The properties of these ionomer resins can vary widely due to variations in acid content, softening comonomer content, the degree of neutralization, and the type of metal ion used in the neutralization. The full range commercially available typically includes ionomers of polymers of general formula, E/X/Y polymer, wherein E is ethylene, X is a $C_3$ to $C_8$ $\alpha,\beta$ ethylenically unsaturated carboxylic acid, such as acrylic or methacrylic acid, and is present in an amount from about 0 wt. % to about 50 wt. %, particularly about 2 to about 30 weight %, of the E/X/Y copolymer, and Y is a softening comonomer selected from the group consisting of alkyl acrylate and alkyl methacrylate, such as methyl acrylate or methyl methacrylate, and wherein the alkyl groups have from 1-8 carbon atoms, Y is in the range of 0 to about 50 weight %, particularly about 5 wt. % to about 35 wt. %, of the E/X/Y copolymer, and wherein the acid groups present in said ionomeric polymer are partially (e.g., about 1% to about 90%) neutralized with a metal selected from the group consisting of lithium, sodium, potassium, magnesium, calcium, barium, lead, tin, zinc or aluminum, or a combination of such cations.

The ionomer may also be a so-called bimodal ionomer as described in U.S. Pat. No. 6,562,906 (the entire contents of which are herein incorporated by reference). These ionomers are bimodal as they are prepared from blends comprising polymers of different molecular weights. Specifically they include bimodal polymer blend compositions comprising:
  a) a high molecular weight component having a molecular weight of about 80,000 to about 500,000 and comprising one or more ethylene/α,β-ethylenically unsaturated $C_{3-8}$ carboxylic acid copolymers and/or one or more ethylene, alkyl (meth)acrylate, (meth)acrylic acid terpolymers; said high molecular weight component being partially neutralized with metal ions selected from the group consisting of lithium, sodium, zinc, calcium, magnesium, and a mixture of any these; and
  b) a low molecular weight component having a molecular weight of about from about 2,000 to about 30,000 and comprising one or more ethylene/α,β-ethylenically unsaturated $C_{3-8}$ carboxylic acid copolymers and/or one or more ethylene, alkyl (meth)acrylate, (meth) acrylic acid terpolymers; said low molecular weight component being partially neutralized with metal ions selected from the group consisting of lithium, sodium, zinc, calcium, magnesium, and a mixture of any these.

In addition to the unimodal and bimodal ionomers, also included are the so-called "modified ionomers" examples of which are described in U.S. Pat. Nos. 6,100,321, 6,329,458 and 6,616,552 and U.S. Patent Publication No. US 2003/0158312 A1, the entire contents of all of which are herein incorporated by reference.

The modified unimodal ionomers may be prepared by mixing:
  a) an ionomeric polymer comprising ethylene, from 5 to 25 weight percent (meth)acrylic acid, and from 0 to 40 weight percent of a (meth)acrylate monomer, said ionomeric polymer neutralized with metal ions selected from the group consisting of lithium, sodium, zinc, calcium, magnesium, and a mixture of any of these; and
  b) from about 5 to about 40 weight percent (based on the total weight of said modified ionomeric polymer) of one or more fatty acids or metal salts of said fatty acid, the metal selected from the group consisting of calcium, sodium, zinc, potassium, and lithium, barium and magnesium and the fatty acid preferably being stearic acid.

The modified bimodal ionomers, which are ionomers derived from the earlier described bimodal ethylene/carboxylic acid polymers (as described in U.S. Pat. No. 6,562,906, the entire contents of which are herein incorporated by reference), are prepared by mixing;
  a) a high molecular weight component having a weight average molecular weight ($M_W$) of about 80,000 to about 500,000 and comprising one or more ethylene/α,β-ethylenically unsaturated $C_{3-8}$ carboxylic acid copolymers and/or one or more ethylene, alkyl (meth) acrylate, (meth)acrylic acid terpolymers; said high molecular weight component being partially neutralized with metal ions selected from the group consisting of lithium, sodium, zinc, calcium, potassium, magnesium, and a mixture of any of these; and
  b) a low molecular weight component having a weight average molecular weight ($M_W$) of about from about 2,000 to about 30,000 and comprising one or more ethylene/α,β-ethylenically unsaturated $C_{3-8}$ carboxylic acid copolymers and/or one or more ethylene, alkyl (meth)acrylate, (meth)acrylic acid terpolymers; said low molecular weight component being partially neutralized with metal ions selected from the group consisting of lithium, sodium, zinc, calcium, potassium, magnesium, and a mixture of any of these; and
  c) from about 5 to about 40 weight percent (based on the total weight of said modified ionomeric polymer) of one or more fatty acids or metal salts of said fatty acid, the metal selected from the group consisting of calcium, sodium, zinc, potassium and lithium, barium and magnesium and the fatty acid preferably being stearic acid.

The fatty or waxy acid salts utilized in the various modified ionomers are composed of a chain of alkyl groups containing from about 4 to 75 carbon atoms (usually even numbered) and characterized by a —COOH terminal group. The generic formula for all fatty and waxy acids above acetic acid is $CH_3 (CH_2)_X COOH$, wherein the carbon atom count includes the carboxyl group. The fatty or waxy acids utilized to produce the fatty or waxy acid salts modifiers may be saturated or unsaturated, and they may be present in solid, semi-solid or liquid form.

Examples of suitable saturated fatty acids, i.e., fatty acids in which the carbon atoms of the alkyl chain are connected by single bonds, include but are not limited to stearic acid ($C_{18}$, i.e., $CH_3 (CH_2)_{16} COOH$), palmitic acid ($C_{16}$, i.e., $CH_3 (CH_2)_{14} COOH$), pelargonic acid ($C_9$, i.e., $CH_3 (CH_2)_7 COOH$) and lauric acid ($C_{12}$, i.e., $CH_3 (CH_2)_{10} OCOOH$). Examples of suitable unsaturated fatty acids, i.e., a fatty acid in which there are one or more double bonds between the carbon atoms in the alkyl chain, include but are not limited to oleic acid ($C_{13}$, i.e., $CH_3 (CH_2)_7 CH:CH(CH_2)_7 COOH$).

The source of the metal ions used to produce the metal salts of the fatty or waxy acid salts used in the various modified ionomers are generally various metal salts which provide the metal ions capable of neutralizing, to various extents, the carboxylic acid groups of the fatty acids. These include the sulfate, carbonate, acetate and hydroxylate salts of zinc, barium, calcium and magnesium.

Since the fatty acid salts modifiers comprise various combinations of fatty acids neutralized with a large number of different metal ions, several different types of fatty acid salts may be utilized in the invention, including metal stearates, laureates, oleates, and palmitates, with calcium, zinc, sodium, lithium, potassium and magnesium stearate being preferred, and calcium and sodium stearate being most preferred.

The fatty or waxy acid or metal salt of said fatty or waxy acid is present in the modified ionomeric polymers in an amount of from about 5 to about 40, preferably from about 7 to about 35, more preferably from about 8 to about 20 weight percent (based on the total weight of said modified ionomeric polymer).

As a result of the addition of the one or more metal salts of a fatty or waxy acid, from about 40 to 100, preferably from about 50 to 100, more preferably from about 70 to 100 percent of the acidic groups in the final modified ionomeric polymer composition are neutralized by a metal ion. An example of such a modified ionomer polymer is DuPont® HPF-1000 available from E. I. DuPont de Nemours and Co. Inc.

In several embodiments the metallic coagent is a metal salt of a carboxylic acid. Illustrative metals include zinc, calcium, magnesium, cobalt, tin, cerium, lanthanum, aluminum, vanadium, manganese, copper, nickel, iron, titanium, zirconium, chromium, scandium, strontium, barium, and bismuth. Illustrative carboxylic acids include (meth)acrylic, cinnamic, hydrocinnamic, butyric, propionic, acetic, isovaleric, pivalic, stearic, maleic, adipic, phenylacetic, undecylenic, naphthoic, isophthalic, phthalic, and combinations thereof. Illustrative metal coagents include the carboxylates of calcium, magnesium, and zinc. For example, zinc dimethacrylate, zinc diacrylate, zinc isobutyrate, zinc propionate, zinc acetate, zinc isovalerate, pivalic acid zinc salt, zinc stearate, maleic acid zinc salt, adipic acid zinc salt, zinc phenylacetate, zinc cinnamate, calcium cinnamate, zinc undecylenate, zinc cinnamate benzoate, zinc cinnamate acetate zinc hydrocinnamate, zinc naphthoate, zinc naphthalene acetate, isophthalic acid zinc salt, and phthalic acid zinc salt, and their equivalents substituting calcium or magnesium instead of zinc as the metal center, and mixtures thereof. Additionally, the metal salts may be metal carboxylates of zinc (Zn), cobalt (Co), tin (Sn), cerium (Ce), lanthanum (La), aluminum (Al), vanadium (V), manganese (Mn), copper (Cu), nickel (Ni), iron (Fe), titanium (Ti), zirconium (Zr), chromium (Cr), scandium (Sc), calcium (Ca), magnesium (Mg), strontium (Sr), barium (Ba), and bismuth (Bi). Specifically, any metal carboxylates having one or more carboxylic functional moieties and/or groups may be employed. While a number of metal carboxylates, or salts thereof, have been found to work for this purpose, zinc cinnamate, zinc hydrocinnamate, zinc naphthalene acetate, and zinc naphthoate are preferred.

The amount of metallic coagent blended with the polyolefin or the ionomer resin should be sufficient to acceptably increase the COR, flexural modulus and/or hardness, but not disproportionate to adversely increase the brittleness. In several embodiments, the amount of metallic coagent blended with the polyolefin or the ionomer resin is at least 1, more particularly 2, and most particularly, 3 wt %, based on the total weight of the blend composition. In several embodiments, the amount of metallic coagent blended with the polyolefin or the ionomer resin is not greater than 40, more particularly 30, and most particularly, 20 wt %, based on the total weight of the blend composition.

Additional Polymer Components

Additional polymers may also be used as a separate component of the core, cover layer or intermediate layer of the golf balls of the present invention. These additional polymers may include, without limitation, other synthetic and natural rubbers, including the polyalkenamers, cis-1,4-polybutadiene, trans-1,4-polybutadiene, 1,2-polybutadiene, cis-polyisoprene, trans-polyisoprene, polychloroprene, polybutylene, styrene-butadiene rubber, styrene-butadiene-styrene block copolymer and partially and fully hydrogenated equivalents, styrene-isoprene-styrene block copolymer and partially and fully hydrogenated equivalents, nitrile rubber, silicone rubber, and polyurethane, as well as mixtures of these, carboxyl-terminated butadiene (CTBN) and butadiene grafted with maleic anhydride (BMA), thermoset polymers such as thermoset polyurethanes and thermoset polyureas, as well as thermoplastic polymers including thermoplastic elastomers such as unimodal ethylene/carboxylic acid copolymers, unimodal ethylene/carboxylic acid/carboxylate terpolymers, bimodal ethylene/carboxylic acid copolymers, bimodal ethylene/carboxylic acid/carboxylate terpolymers, unimodal ionomers, bimodal ionomers, modified unimodal ionomers, modified bimodal ionomers, thermoplastic polyurethanes, thermoplastic polyureas, polyesters, copolyesters, polyamides, copolyamides, polycarbonates, polyolefins, polyphenylene oxide, polyphenylene sulfide, diallyl phthalate polymer, polyimides, polyvinyl chloride, polyamide-ionomer, polyurethane-ionomer, polyvinyl alcohol, polyarylate, polyacrylate, polyphenylene ether, impact-modified polyphenylene ether, polystyrene, high impact polystyrene, acrylonitrile-butadiene-styrene copolymer styrene-acrylonitrile (SAN), acrylonitrile-styrene-acrylonitrile, styrene-maleic anhydride (S/MA) polymer, styrenic copolymer, functionalized styrenic copolymer, functionalized styrenic terpolymer, styrenic terpolymer, cellulose polymer, liquid crystal polymer (LCP), ethylene-propylene-diene terpolymer (EPDM), ethylene-vinyl acetate copolymers (EVA), ethylene-propylene copolymer, ethylene vinyl acetate, polyurea, and polysiloxane and any and all combinations thereof.

The olefinic thermoplastic elastomers include metallocene-catalyzed polyolefins, ethylene-octene copolymer, ethylene-butene copolymer, and ethylene-propylene copolymers all with or without controlled tacticity as well as blends of polyolefins having ethyl-propylene-non-conjugated diene terpolymer, rubber-based copolymer, and dynamically vulcanized rubber-based copolymer. Examples of these include products sold under the trade names SANTOPRENE, DYTRON, VISAFLEX, and VYRAM by Advanced Elastomeric Systems of Houston, Tex., and SARLINK by DSM of Haarlen, the Netherlands.

Examples of rubber-based thermoplastic elastomers include multiblock rubber-based copolymers, particularly those in which the rubber block component is based on butadiene, isoprene, or ethylene/butylene. The non-rubber repeating units of the copolymer may be derived from any suitable monomers, including meth(acrylate) esters, such as methyl methacrylate and cyclohexylmethacrylate, and vinyl arylenes, such as styrene. Examples of styrenic copolymers are resins manufactured by Kraton Polymers (formerly of Shell Chemicals) under the trade names KRATON D (for styrene-butadiene-styrene and styrene-isoprene-styrene types) and KRATON G (for styrene-ethylene-butylene-styrene and styrene-ethylene-propylene-styrene types) and Kuraray under the trade name SEPTON. Examples of randomly distributed styrenic polymers include paramethylstyrene-isobutylene (isobutene) copolymers developed by ExxonMobil Chemical Corporation and styrene-butadiene random copolymers developed by Chevron Phillips Chemical Corp.

Further polymers include copolyester thermoplastic elastomers which include polyether ester block copolymers, polylactone ester block copolymers, and aliphatic and aromatic dicarboxylic acid copolymerized polyesters. Polyether ester block copolymers are copolymers comprising polyester hard segments polymerized from a dicarboxylic acid and a low molecular weight diol, and polyether soft segments polymerized from an alkylene glycol having 2 to 10 atoms. Polylactone ester block copolymers are copolymers having polylactone chains instead of polyether as the soft segments discussed above for polyether ester block copolymers. Aliphatic and aromatic dicarboxylic copolymerized polyesters are copolymers of an acid component selected from aromatic dicarboxylic acids, such as terephthalic acid and isophthalic acid, and aliphatic acids having 2 to 10 carbon atoms with at least one diol component, selected from aliphatic and alicyclic diols having 2 to 10 carbon atoms. Blends of aromatic polyester and aliphatic polyester also may be used for these. Examples of these include products marketed under the trade names HYTREL by E.I. DuPont de Nemours & Company, and SKYPEL by S.K. Chemicals of Seoul, South Korea.

Examples of other thermoplastic elastomers suitable as additional polymer components include those having functional groups, such as carboxylic acid, maleic anhydride, glycidyl, norbornene, and hydroxyl functionalities. An example of these includes a block polymer having at least one polymer block A comprising an aromatic vinyl compound and at least one polymer block B comprising a conjugated diene compound, and having a hydroxyl group at the terminal block copolymer, or its hydrogenated product.

An example of this polymer is sold under the trade name SEPTON HG-252 by Kuraray Company of Kurashiki, Japan. Other examples of these include: maleic anhydride functionalized triblock copolymer consisting of polystyrene end blocks and poly(ethylene/butylene), sold under the trade name KRATON FG 1901X by Shell Chemical Company; maleic anhydride modified ethylene-vinyl acetate copolymer, sold under the trade name FUSABOND by E.I. DuPont de Nemours & Company; ethylene-isobutyl acrylate-methacrylic acid terpolymer, sold under the trade name NUCREL by E.I. DuPont de Nemours & Company; ethylene-ethyl acrylate-methacrylic anhydride terpolymer, sold under the trade name BONDINE AX 8390 and 8060 by Sumitomo Chemical Industries; brominated styrene-isobutylene copolymers sold under the trade name BROMO XP-50 by Exxon Mobil Corporation; and resins having glycidyl or maleic anhydride functional groups sold under the trade name LOTADER by Elf Atochem of Puteaux, France.

The other polymer materials may also include the polyamides. The term "polyamide" as used herein includes both homopolyamides and copolyamides. Illustrative polyamides for use in the polyalkenamer/polyamide compositions include those obtained by: (1) polycondensation of (a) a dicarboxylic acid, such as oxalic acid, adipic acid, sebacic acid, terephthalic acid, isophthalic acid, or 1,4-cyclohexanedicarboxylic acid, with (b) a diamine, such as ethylenediamine, tetramethylenediamine, pentamethylenediamine, hexamethylenediamine, decamethylenediamine, 1,4-cyclohexyldiamine or m-xylylenediamine; (2) a ring-opening polymerization of cyclic lactam, such as ε-caprolactam or ω-laurolactam; (3) polycondensation of an aminocarboxylic acid, such as 6-aminocaproic acid, 9-aminononanoic acid, 11-aminoundecanoic acid or 12-aminododecanoic acid; (4) copolymerization of a cyclic lactam with a dicarboxylic acid and a diamine; or any combination of (1)-(4). In certain examples, the dicarboxylic acid may be an aromatic dicarboxylic acid or a cycloaliphatic dicarboxylic acid. In certain examples, the diamine may be an aromatic diamine or a cycloaliphatic diamine. Specific examples of suitable polyamides include polyamide 6; polyamide 11; polyamide 12; polyamide 4,6; polyamide 6,6; polyamide 6,9; polyamide 6,10; polyamide 6,12; polyamide MXD6; PA12, CX; PA12, IT; PPA; PA6, IT; and PA6/PPE. Also included are the crosslinked polyamide compositions descried in copending application 61/746,540 filed on the 27$^{th}$ of December 2012 in the name of the Taylor Made Golf Co. Inc and incorporated herein by reference in its entirety.

The polyamide (which may a polyamide as described above) may also be blended with a functional polymer modifier of. The functional polymer modifier of the polyamide can include copolymers or terpolymers having a glycidyl group, hydroxyl group, maleic anhydride group or carboxylic group, collectively referred to as functionalized polymers. These copolymers and terpolymers may comprise an α-olefin. Examples of suitable α-olefins include ethylene, propylene, 1-butene, 1-pentene, 3-methyl-1-butene, 1-hexene, 4-methyl-1-petene, 3-methyl-1-pentene, 1-octene, 1-decene-, 1-dodecene, 1-tetradecene, 1-hexadecene, 1-octadecene, 1-eicocene, 1-dococene, 1-tetracocene, 1-hexacocene, 1-octacocene, and 1-triacontene. One or more of these α-olefins may be used.

Examples of suitable glycidyl groups in copolymers or terpolymers in the polymeric modifier include esters and ethers of aliphatic glycidyl, such as allylglycidylether, vinylglycidylether, glycidyl maleate and itaconatem glycidyl acrylate and methacrylate, and also alicyclic glycidyl esters and ethers, such as 2-cyclohexene-1-glycidylether, cyclohexene-4,5 diglyxidylcarboxylate, cyclohexene-4-glycidyl carboxylate, 5-norboenene-2-methyl-2-glycidyl carboxylate, and endocis-bicyclo(2,2,1)-5-heptene-2,3-diglycidyl dicarboxylate. These polymers having a glycidyl group may comprise other monomers, such as esters of unsaturated carboxylic acid, for example, alkyl(meth)acrylates or vinyl esters of unsaturated carboxylic acids. Polymers having a glycidyl group can be obtained by copolymerization or graft polymerization with homopolymers or copolymers.

Examples of suitable terpolymers having a glycidyl group include LOTADER AX8900 and AX8920, marketed by Atofina Chemicals, ELVALOY marketed by E.I. Du Pont de Nemours & Co., and REXPEARL marketed by Nippon Petrochemicals Co., Ltd. Additional examples of copolymers comprising epoxy monomers and which are suitable for use within the scope of the present invention include styrene-butadiene-styrene block copolymers in which the polybutadiene block contains epoxy group, and styrene-isoprene-styrene block copolymers in which the polyisoprene block contains epoxy. Commercially available examples of these epoxy functional copolymers include ESBS A1005, ESBS A1010, ESBS A1020, ESBS AT018, and ESBS AT019, marketed by Daicel Chemical Industries, Ltd.

Examples of polymers or terpolymers incorporating a maleic anhydride group suitable for use within the scope of the present invention include maleic anhydride-modified ethylene-propylene copolymers, maleic anhydride-modified ethylene-propylene-diene terpolymers, maleic anhydride-modified polyethylenes, maleic anhydride-modified polypropylenes, ethylene-ethylacrylate-maleic anhydride terpolymers, and maleic anhydride-indene-styrene-cumarone polymers. Examples of commercially available copolymers incorporating maleic anhydride include: BONDINE, marketed by Sumitomo Chemical Co., such as BONDINE AX8390, an ethylene-ethyl acrylate-maleic anhydride terpolymer having a combined ethylene acrylate and maleic anhydride content of 32% by weight, and BONDINE TX TX8030, an ethylene-ethyl acrylate-maleic anhydride terpolymer having a combined ethylene acrylate and maleic anhydride content of 15% by weight and a maleic anhydride content of 1% to 4% by weight; maleic anhydride-containing LOTADER 3200, 3210, 6200, 8200, 3300, 3400, 3410, 7500, 5500, 4720, and 4700, marketed by Atofina Chemicals; EXXELOR VA 1803, a maleic anhydride-modified ethylene-propylene copolymer having a maleic anhydride content of 0.7% by weight, marketed by Exxon Chemical Co.; and KRATON FG 1901X, a maleic anhydride functionalized triblock copolymer having polystyrene endblocks and poly(ethylene/butylene) midblocks, marketed by Shell Chemical.

Preferably the functional polymer component is a maleic anhydride grafted polymer, preferably a maleic anhydride grafted polyolefin (for example, Exxellor VA 1803). Styrenic block copolymers are copolymers of styrene with butadiene, isoprene, or a mixture of the two. Additional unsaturated monomers may be added to the structure of the styrenic block copolymer as needed for property modification of the resulting SBC/urethane copolymer. The styrenic block copolymer can be a diblock or a triblock styrenic polymer. Examples of such styrenic block copolymers are described in, for example, U.S. Pat. No. 5,436,295 to Nishikawa et al. The styrenic block copolymer can have any known molecular weight for such polymers, and it can possess a linear, branched, star, dendrimeric or combination molecular structure. The styrenic block copolymer can be unmodified by functional groups, or it can be modified by hydroxyl group, carboxyl group, or other functional groups, either in its chain structure or at one or more terminus. The styrenic block copolymer can be obtained using any common process for manufacture of such polymers. The styrenic block copolymers also may be hydrogenated using well-known methods to obtain a partially or fully saturated diene monomer block.

Other materials suitable for use as additional polymers in the presently disclosed golf balls include polyester thermoplastic elastomers marketed under the tradename SKY-PEL™ by SK Chemicals of South Korea, or diblock or triblock copolymers marketed under the tradename SEPTON™ by Kuraray Corporation of Kurashiki, Japan, and KRATON™ by Kraton Polymers Group of Companies of Chester, United Kingdom. For example, SEPTON HG 252 is a triblock copolymer, which has polystyrene end blocks and a hydrogenated polyisoprene midblock and has hydroxyl groups at the end of the polystyrene blocks. HG-252 is commercially available from Kuraray America Inc. (Houston, Tex.).

A further example of a material suitable for use as additional polymers in the presently disclosed golf balls is a specialty propylene elastomer as described, for example, in US 2007/0238552 A1, and incorporated herein by reference in its entirety. A specialty propylene elastomer includes a thermoplastic propylene-ethylene copolymer composed of a majority amount of propylene and a minority amount of ethylene. These copolymers have at least partial crystallinity due to adjacent isotactic propylene units. Although not bound by any theory, it is believed that the crystalline segments are physical crosslinking sites at room temperature, and at high temperature (i.e., about the melting point), the physical crosslinking is removed and the copolymer is easy to process. According to one embodiment, a specialty propylene elastomer includes at least about 50 mole % propylene co-monomer. Specialty propylene elastomers can also include functional groups such as maleic anhydride, glycidyl, hydroxyl, and/or carboxylic acid. Suitable specialty propylene elastomers include propylene-ethylene copolymers produced in the presence of a metallocene catalyst. More specific examples of specialty propylene elastomers are illustrated below. Specialty propylene elastomers are commercially available under the tradename VISTAMAXX from ExxonMobil Chemical.

An especially preferred component suitable for use as an additional polymer in the presently disclosed golf balls include the polyalkenamers. The term "polyalkenamer" is used interchangeably herein with the term "polyalkenamer rubber" and means a rubbery polymer of one or more cycloalkenes having from 4-20, ring carbon atoms. The polyalkenamers may be prepared by ring opening metathesis polymerization of one or more cycloalkenes in the presence of organometallic catalysts as described in U.S. Pat. Nos. 3,492,245, and 3,804,803, the entire contents of both of which are herein incorporated by reference.

Another component for use as an additional polymer in the presently disclosed golf balls include the carboxylated elastomers described in copending application Ser. No. 13/719,060 filed on December 18$^{th}$, 2012 in the name of Taylor Made Golf Co., the entire contents of which are herein incorporated by reference. The term carboxylated elastomer (CE) composition as used herein is intended to mean the family of polymers which are long chain elastomeric rubbers containing pendant carboxyl groups at random various points along the chain as may be graphically illustrated below:

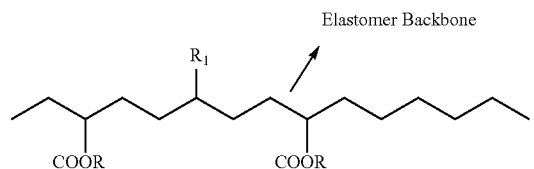

The carboxylated elastomer comprises an elastomer backbone and carboxy pendant groups, wherein R may be a hydrogen, a metal (for example, an alkali metal, an alkaline earth metal, or a transition metal), an ammonium or a quaternary ammonium group, an acyl group (for example acetyl ($CH_3C(O)$) group), an alkyl group (such as an ester), an acid anhydride group, and combinations thereof; and $R_1$ may be a hydrogen, an alkyl, or an aryl group. Although the pendant carboxy groups are depicted as being in interior positions along the elastomer backbone, the carboxylated elastomer may also include terminal carboxy groups occurring at one or more chain ends.

One method of introducing the carboxy groups is by copolymerization of a suitable olefin monomer with a monomer comprising a carboxy group. The first preparation of a carboxylic elastomer was recorded in 1933 and involved the copolymerization of butadiene and acrylic acid. Examples of suitable olefin monomers, include, but are not limited to, styrene, vinyltoluene, alpha-methylstyrene, butadiene, isoprene, hexadiene, dichlorovinylidene, vinylchloride, ethylene, propylene, butylene, and isobutylene. Examples of suitable monomers comprising a carboxy group include, but are not limited to, acrylic acid, alkyacrylate, alkyl alkacrylates, maleic anhydride, maleimide, acrylamide and 2-acrylamido-2-methyl-1-propane sulfonic acid.

A class of carboxylated elastomers for use in this invention are the carboxylated nitrile rubbers which may be any of those known in the art. These are copolymers of butadiene, acrylonitrile and one or more α,μ-unsaturated carboxylic acids and which have nitrile rubber as the elastomer backbone. A diagram of the backbone is shown below.

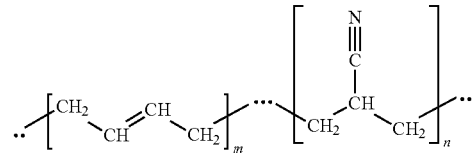

The carboxylic acids which are pendant to the above backbone may contain one or more carboxylic groups. Because of cost and availability, it is preferred that the carboxylic acids be selected from acrylic, methacrylic, fumaric, maleic and itaconic acids. The copolymers may be prepared by the well known emulsion free radical process. The acrylonitrile content of the copolymer may be from about 20 to about 40 percent by weight of the copolymer. The total content of carboxylic acid in the copolymer may be from about 0.5 to about 10 percent by weight of the copolymer. Butadiene forms the balance to 100 percent by weight of the copolymer. The viscosity of the copolymer is generally within the Mooney range (ML 1+4 at 100° C.) of from about 40 to about 80. U. S. Pat. Nos. 4,271,052 and 4,525,517 disclose carboxylated nitrile rubbers for use in this invention and such disclosures are incorporated herein by reference. There are a number of carboxylated elastomers that are commercially available from Noveon under the tradename HYCAR including HYCAR CTBN 1300X8 and CTBN 1300X8F which are a carboxyl terminated butadiene-acrylonitrile copolymers. HYCAR VTBNX 1300X33 which is a methacrylate terminated butadiene-acrylonitrile copolymer and HYCAR ATBN 1300X16 is an amine terminated butadiene-acrylonitrile.

Another method for introducing the carboxy groups into the particular elastomer backbone is by grafting carboxy groups onto an elastomer backbone. The elastomers may include styrene butadiene random and block copolymers, hydrogenated styrene butadiene random and block copolymers, acrylonitrile butadiene styrene ("ABS") copolymers, ethylene-propylene-diene-monomer (EPDM) copolymers, styrene-acrylic copolymers, acrylonitrile butadiene rubber (NBR) polymers, methylmethacrylate butadiene styrene (MBS) rubbers, and styrene-acrynitrile rubbers. Carboxy groups may be grafted onto a hydrophobic particulate elastomer to form a suitable graft particulate elastomer using a variety of suitable carboxylating materials, including, but not limited to, maleic acid, maleic anhydride, and diesters and monoesters of maleic acid, maleimide, fumaric acid and its derivatives, acrylic acid, alkylacrylate, alkylalkacrylates, acrylamide, 2-acrylamido-2-methyl-1-propanesulfonic acid and its salts.

Examples of suitable graft particulate elastomers include, but are not limited to, maleated polybutadienes, maleated styrene butadiene rubbers ("SBR"), maleated acrylonitrile-styrene-butadiene ("ABS") rubbers, maleated nitrile-butadiene rubbers ("NBR"), maleated hydrogenated acrylonitrile butadiene rubbers ("HNBR"), methylmethacrylate butadiene styrene ("MBS") rubbers, carboxylated ethylene-propylene-diene monomer rubbers, carboxylated styrene-acrynitrile rubbers ("SAN"), carboxylated ethylene propylene diene rubbers ("EPDM"), acrylic grafted silicone rubbers, and combinations thereof. An example of a suitable hydrogenated acrylonitrile butadiene rubber ("HNBR") that is grafted with carboxylating materials is available from Lanxess Corporation, Leverkusen, Germany, under the trade name THERBAN® XT. An example of a suitable nitrile-butadiene rubbers ("NBR") that is grafted with carboxylating materials is available from Zeon Chemicals, L.P., Louisville, Ky., under the trade name NIPOL® NBR 1072 CGX. Examples of suitable butadiene based rubbers that are grafted with carboxylating materials are available from Mitsubishi Rayon Company Ltd., Tokyo, Japan, under the trade names METABLENS® C and E. An example of an acrylic rubber that is grafted with carboxylating materials is available from Mitsubishi Rayon Company Limited, Tokyo, Japan, under the trade name METABLEN® W. An example of a suitable silicone based elastomer that is grafted with carboxylating materials is available from Mitsubishi Rayon America Inc., New York, N.Y., under the trade name METABLEN® S. An example of a suitable styrene butadiene particulate elastomer grafted with maleic acid available as an experimental product (Eliokem XPR-100) from Eliokem Corporation.

Most preferred are the grafted polyisoprene compounds including Kurary LIR403 which is a polyisoprene-graft-maleic anhydride having the following chemical structure:

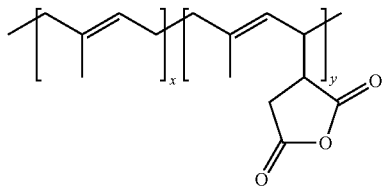

Also included is Kurary LIR410 which is a polyisoprene-graft-maleic anhydride monoester of maleic anhydride having the following chemical structure:

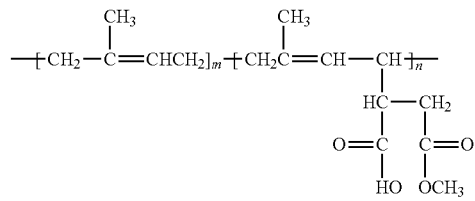

where n is approximately 10, and the material has a weight average molecular weight of about 25,000, and a glass transition temperature of −59° C.

The cover layer and/or one or more inner cover layers of the golf ball may comprise one or more thermoplastic or thermoset polyurethanes or polyureas. Polyurethanes or polyureas typically are prepared by reacting a diisocyanate with a polyol (in the case of polyurethanes) or with a polyamine (in the case of a polyurea). Thermoplastic polyurethanes or polyureas may consist solely of this initial mixture or may be further combined with a chain extender to vary properties such as hardness of the thermoplastic. Thermoset polyurethanes or polyureas typically are formed by the reaction of a diisocyanate and a polyol or polyamine respectively, and an additional crosslinking agent to crosslink or cure the material to result in a thermoset.

In what is known as a one-shot process, the three reactants, diisocyanate, polyol or polyamine, and optionally a chain extender or a curing agent, are combined in one step. Alternatively, a two-step process may occur in which the first step involves reacting the diisocyanate and the polyol (in the case of polyurethane) or the polyamine (in the case of a polyurea) to form a so-called prepolymer, to which can then be added either the chain extender or the curing agent. This procedure is known as the prepolymer process.

In addition, although depicted as discrete component packages as above, it is also possible to control the degree of crosslinking, and hence the degree of thermoplastic or thermoset properties in a final composition, by varying the stoichiometry not only of the diisocyanate-to-chain extender or curing agent ratio, but also the initial diisocyanate-to-polyol or polyamine ratio. Of course in the prepolymer process, the initial diisocyanate-to-polyol or polyamine ratio is fixed on selection of the required prepolymer.

Finally, in addition to discrete thermoplastic or thermoset materials, it also is possible to modify a thermoplastic polyurethane or polyurea composition by introducing materials in the composition that undergo subsequent curing after molding the thermoplastic to provide properties similar to those of a thermoset. For example, Kim in U.S. Pat. No. 6,924,337, the entire contents of which are hereby incorporated by reference, discloses a thermoplastic urethane or urea composition optionally comprising chain extenders and further comprising a peroxide or peroxide mixture, which can then undergo post curing to result in a thermoset. Also, Kim et al. in U.S. Pat. No. 6,939,924, the entire contents of which are hereby incorporated by reference, discloses a thermoplastic urethane or urea composition, optionally also comprising chain extenders, that is prepared from a diisocyanate and a modified or blocked diisocyanate which unblocks and induces further cross linking post extrusion. The modified isocyanate preferably is selected from the group consisting of: isophorone diisocyanate (IPDI)-based uretdione-type crosslinker; a combination of a uretdione adduct of IPDI and a partially e-caprolactam-modified IPDI; a combination of isocyanate adducts modified by e-caprolactam and a carboxylic acid functional group; a caprolactam-modified Desmodur diisocyanate; a Desmodur diisocyanate having a 3,5-dimethyl pyrazole modified isocyanate; or mixtures of these.

Finally, Kim et al. in U.S. Pat. No. 7,037,985 B2, the entire contents of which are hereby incorporated by reference, discloses thermoplastic urethane or urea compositions further comprising a reaction product of a nitroso compound and a diisocyanate or a polyisocyanate. The nitroso reaction product has a characteristic temperature at which it decomposes to regenerate the nitroso compound and diisocyanate or polyisocyanate. Thus, by judicious choice of the post-processing temperature, further crosslinking can be induced in the originally thermoplastic composition to provide thermoset-like properties.

In view of the advantages of injection molding versus the more complex casting process, under some circumstances it is advantageous to have formulations capable of curing as a thermoset but only within a specified temperature range above that of the typical injection molding process. This allows parts, such as golf ball cover layers, to be initially injection molded, followed by subsequent processing at higher temperatures and pressures to induce further crosslinking and curing, resulting in thermoset properties in the final part. Such an initially injection moldable composition is thus called a post curable urethane or urea composition.

If a post curable urethane composition is required, a modified or blocked diisocyanate which subsequently unblocks and induces further cross linking post extrusion may be included in the diisocyanate starting material. Modified isocyanates used for making the polyurethanes of the present invention generally are defined as chemical compounds containing isocyanate groups that are not reactive at room temperature, but that become reactive once they reach a characteristic temperature. The resulting isocyanates can act as crosslinking agents or chain extenders to form crosslinked polyurethanes. The degree of crosslinking is governed by type and concentration of modified isocyanate presented in the composition. The modified isocyanate used in the composition preferably is selected, in part, to have a characteristic temperature sufficiently high such that the urethane in the composition will retain its thermoplastic behavior during initial processing (such as injection molding). If a characteristic temperature is too low, the composition crosslinks before processing is completed, leading to process difficulties. The modified isocyanate preferably is selected from isophorone diisocyanate (IPDI)-based uretdione-type crosslinker, a combination of a uretdione adduct of IPDI and a partially e-caprolactam-modified IPDI; a combination of isocyanate adducts modified by e-caprolactam and a carboxylic acid functional group; a caprolactam-modified Desmodur diisocyanate; a Desmodur diisocyanate having a 3,5-dimethyl pyrazole modified isocyanate; or mixtures of these. Particular preferred examples of modified isocyanates include those marketed under the trade name CRELAN by Bayer Corporation. Examples of these include: CRELAN TP LS 2147; CRELAN NI 2; isophorone diisocyanate (IPDI)-based uretdione-type crosslinker, such as CRELAN VP LS 2347; a combination of a uretdione adduct of IPDI and a partially e-caprolactam-modified IPDI, such as CRELAN VP LS 2386; a combination of isocyanate adducts modified by e-caprolactam and a carboxylic acid functional group, such as CRELAN VP LS 2181/1; a caprolactam-modified Desmodur diisocyanate, such as CRELAN NW5; and a Desmodur diisocyanate having a 3,5-dimethyl pyrazole modified isocyanate, such as CRELAN XP 7180. These modified isocyanates may be used either alone or in combination. Such modified diisocyanates are described in more detail in U.S. Pat. No. 6,939,924, the entire contents of which are hereby incorporated by reference.

As an alternative if a post curable polyurethane or polyurea composition is required, the diisocyanate may further comprise reaction product of a nitroso compound and a diisocyanate or a polyisocyanate. The reaction product has a characteristic temperature at which it decomposes regenerating the nitroso compound and diisocyanate or polyisocyanate, which can, by judicious choice of the post processing temperature, in turn induce further crosslinking in the originally thermoplastic composition resulting in thermoset-like properties. Such nitroso compounds are described in more detail in U.S. Pat. No. 7,037,985 B2, the entire contents of which are hereby incorporated by reference.

The cover layer and/or one or more inner cover layers of the golf ball may comprise one or more ionomer resins. One family of such resins was developed in the mid-1960's, by E.I. DuPont de Nemours and Co., and sold under the trademark SURLYN®. Preparation of such ionomers is well known, for example see U.S. Pat. No. 3,264,272. Generally speaking, most commercial ionomers are unimodal and consist of a polymer of a mono-olefin, e.g., an alkene, with an unsaturated mono- or dicarboxylic acids having 3 to 12 carbon atoms. An additional monomer in the form of a mono- or dicarboxylic acid ester may also be incorporated in the formulation as a so-called "softening comonomer". The incorporated carboxylic acid groups are then neutralized by a basic metal ion salt, to form the ionomer. The metal cations of the basic metal ion salt used for neutralization include $Li^+$, $Na^+$, $K^+$, $Zn^{2+}$, $Ca^{2+}$, $Co^{2+}$, $Ni^{2+}$, $Cu^{2+}$, $Pb^{2+}$, and $Mg^{2+}$, with the $Li^+$, $Na^+$, $Ca^{2+}$, $Zn^{2+}$, and $Mg^{2+}$ being preferred. The basic metal ion salts include those of for example formic acid, acetic acid, nitric acid, and carbonic acid, hydrogen carbonate salts, oxides, hydroxides, and alkoxides.

Today, there are a wide variety of commercially available ionomer resins based both on copolymers of ethylene and (meth)acrylic acid or terpolymers of ethylene and (meth) acrylic acid and (meth)acrylate, all of which can be used as a golf ball component. The properties of these ionomer resins can vary widely due to variations in acid content, softening comonomer content, the degree of neutralization, and the type of metal ion used in the neutralization. The full range commercially available typically includes ionomers of polymers of general formula, E/X/Y polymer, wherein E is ethylene, X is a $C_3$ to $C_8$ α,β ethylenically unsaturated carboxylic acid, such as acrylic or methacrylic acid, and is present in an amount from about 0 wt. % to about 50 wt. %, particularly about 2 to about 30 weight %, of the E/X/Y copolymer, and Y is a softening comonomer selected from the group consisting of alkyl acrylate and alkyl methacrylate, such as methyl acrylate or methyl methacrylate, and wherein the alkyl groups have from 1-8 carbon atoms, Y is in the range of 0 to about 50 weight %, particularly about 5 wt. % to about 35 wt. %, of the E/X/Y copolymer, and wherein the acid groups present in said ionomeric polymer are partially (e.g., about 1% to about 90%) neutralized with a metal selected from the group consisting of lithium, sodium, potassium, magnesium, calcium, barium, lead, tin, zinc or aluminum, or a combination of such cations.

The ionomer may also be a so-called bimodal ionomer as described in U.S. Pat. No. 6,562,906 (the entire contents of which are herein incorporated by reference). These ionomers are bimodal as they are prepared from blends comprising polymers of different molecular weights. Specifically they include bimodal polymer blend compositions comprising:
   a) a high molecular weight component having a molecular weight of about 80,000 to about 500,000 and comprising one or more ethylene/α,β-ethylenically unsaturated $C_{3-8}$ carboxylic acid copolymers and/or one or more ethylene, alkyl (meth)acrylate, (meth)acrylic acid terpolymers; said high molecular weight component being partially neutralized with metal ions selected from the group consisting of lithium, sodium, zinc, calcium, magnesium, and a mixture of any these; and
   b) a low molecular weight component having a molecular weight of about from about 2,000 to about 30,000 and comprising one or more ethylene/α,β-ethylenically unsaturated $C_{3-8}$ carboxylic acid copolymers and/or one or more ethylene, alkyl (meth)acrylate, (meth) acrylic acid terpolymers; said low molecular weight component being partially neutralized with metal ions selected from the group consisting of lithium, sodium, zinc, calcium, magnesium, and a mixture of any these.

In addition to the unimodal and bimodal ionomers, also included are the so-called "modified ionomers" examples of which are described in U.S. Pat. Nos. 6,100,321, 6,329,458 and 6,616,552 and U.S. Patent Publication No. US 2003/0158312 A1, the entire contents of all of which are herein incorporated by reference.

The modified unimodal ionomers may be prepared by mixing:
   a) an ionomeric polymer comprising ethylene, from 5 to 25 weight percent (meth)acrylic acid, and from 0 to 40 weight percent of a (meth)acrylate monomer, said ionomeric polymer neutralized with metal ions selected from the group consisting of lithium, sodium, zinc, calcium, magnesium, and a mixture of any of these; and
   b) from about 5 to about 40 weight percent (based on the total weight of said modified ionomeric polymer) of one or more fatty acids or metal salts of said fatty acid, the metal selected from the group consisting of calcium, sodium, zinc, potassium, and lithium, barium and magnesium and the fatty acid preferably being stearic acid.

The modified bimodal ionomers, which are ionomers derived from the earlier described bimodal ethylene/carboxylic acid polymers (as described in U.S. Pat. No. 6,562,906, the entire contents of which are herein incorporated by reference), are prepared by mixing;
   a) a high molecular weight component having a weight average molecular weight ($M_W$) of about 80,000 to about 500,000 and comprising one or more ethylene/α,β-ethylenically unsaturated $C_{3-8}$ carboxylic acid copolymers and/or one or more ethylene, alkyl (meth) acrylate, (meth)acrylic acid terpolymers; said high molecular weight component being partially neutralized with metal ions selected from the group consisting of lithium, sodium, zinc, calcium, potassium, magnesium, and a mixture of any of these; and
   b) a low molecular weight component having a weight average molecular weight ($M_W$) of about from about 2,000 to about 30,000 and comprising one or more ethylene/α,β-ethylenically unsaturated $C_{3-8}$ carboxylic acid copolymers and/or one or more ethylene, alkyl (meth)acrylate, (meth)acrylic acid terpolymers; said low molecular weight component being partially neutralized with metal ions selected from the group consisting of lithium, sodium, zinc, calcium, potassium, magnesium, and a mixture of any of these; and
   c) from about 5 to about 40 weight percent (based on the total weight of said modified ionomeric polymer) of one or more fatty acids or metal salts of said fatty acid, the metal selected from the group consisting of calcium, sodium, zinc, potassium and lithium, barium and magnesium and the fatty acid preferably being stearic acid.

The fatty or waxy acid salts utilized in the various modified ionomers are composed of a chain of alkyl groups containing from about 4 to 75 carbon atoms (usually even numbered) and characterized by a —COOH terminal group. The generic formula for all fatty and waxy acids above acetic acid is $CH_3 (CH_2)_X COOH$, wherein the carbon atom count includes the carboxyl group. The fatty or waxy acids utilized to produce the fatty or waxy acid salts modifiers may be saturated or unsaturated, and they may be present in solid, semi-solid or liquid form.

Examples of suitable saturated fatty acids, i.e., fatty acids in which the carbon atoms of the alkyl chain are connected by single bonds, include but are not limited to stearic acid ($C_{18}$, i.e., $CH_3 (CH_2)_{16} COOH$), palmitic acid ($C_{16}$, i.e., $CH_3 (CH_2)_{14} COOH$), pelargonic acid ($C_9$, i.e., $CH_3 (CH_2)_7 COOH$) and lauric acid ($C_{12}$, i.e., $CH_3 (CH_2)_{10} OCOOH$). Examples of suitable unsaturated fatty acids, i.e., a fatty acid in which there are one or more double bonds between the carbon atoms in the alkyl chain, include but are not limited to oleic acid ($C_{13}$, i.e., $CH_3 (CH_2)_7 CH:CH(CH_2)_7 COOH$).

The source of the metal ions used to produce the metal salts of the fatty or waxy acid salts used in the various modified ionomers are generally various metal salts which provide the metal ions capable of neutralizing, to various extents, the carboxylic acid groups of the fatty acids. These include the sulfate, carbonate, acetate and hydroxylate salts of zinc, barium, calcium and magnesium.

Since the fatty acid salts modifiers comprise various combinations of fatty acids neutralized with a large number of different metal ions, several different types of fatty acid salts may be utilized in the invention, including metal stearates, laureates, oleates, and palmitates, with calcium, zinc, sodium, lithium, potassium and magnesium stearate being preferred, and calcium and sodium stearate being most preferred.

The fatty or waxy acid or metal salt of said fatty or waxy acid is present in the modified ionomeric polymers in an amount of from about 5 to about 40, preferably from about 7 to about 35, more preferably from about 8 to about 20 weight percent (based on the total weight of said modified ionomeric polymer).

As a result of the addition of the one or more metal salts of a fatty or waxy acid, from about 40 to 100, preferably from about 50 to 100, more preferably from about 70 to 100 percent of the acidic groups in the final modified ionomeric polymer composition are neutralized by a metal ion. An example of such a modified ionomer polymer is DuPont® HPF-1000 available from E. I. DuPont de Nemours and Co. Inc.

The cover layer and/or one or more inner cover layers of the golf ball may comprise a blend of an ionomer and a block copolymer. An example of a block copolymer is a functionalized styrenic block copolymer, the block copolymer incorporating a first polymer block having an aromatic vinyl compound, a second polymer block having a conjugated diene compound in which the ratio of block copolymer to ionomer ranges from 5:95 to 95:5 by weight, more preferably from about 10:90 to about 90:10 by weight, more preferably from about 20:80 to about 80:20 by weight, more preferably from about 30:70 to about 70:30 by weight and most preferably from about 35:65 to about 65:35 by weight. A preferred block copolymer is SEPTON HG-252. Such blends are described in more detail in commonly-assigned U.S. Pat. No. 6,861,474 and U.S. Patent Publication No. 2003/0224871 both of which are incorporated herein by reference in their entireties.

Another material which also may be used as a separate component of the cover layer or intermediate layer of the golf balls of the present invention is a multi-component blend composition ("MCBC") prepared by blending together at least three materials, identified as Components A, B, and C, and melt-processing these components to form in-situ, a polymer blend composition incorporating a pseudo-crosslinked polymer network. Such blends are more fully described in U.S. Pat. No. 6,930,150 to H. J. Kim, the entire contents of which are hereby incorporated by reference.

The first of these blend components (blend Component A) include block copolymers including di and triblock copolymers, incorporating a first polymer block having an aromatic vinyl compound, and a second polymer block having an olefinic and/or conjugated diene compound. Preferred aromatic vinyl compounds include styrene, α-methylstyrene, o-, m- or p-methylstyrene, 4-propylstyrene, 1,3-dimethylstyrene, vinylnaphthalene and vinylanthracene. In particular, styrene and α-methylstyrene are preferred. These aromatic vinyl compounds can each be used alone, or can be used in combination of two or more kinds. The aromatic vinyl compound is preferably contained in the block copolymer (b) in an amount of from 5 to 75% by weight, and more preferably from 10 to 65% by weight.

The conjugated diene compound, that constitutes the polymer block B in the block copolymer (b), includes, e.g., 1, 3-butadiene, isoprene, 2, 3-dimethyl-1, 3-butadiene, 1, 3-pentadiene and 1, 3-hexadiene. In particular, isoprene and 1, 3-butadiene are preferred. These conjugated diene compounds can each be used alone, or can be used in combination of two or more kinds.

Preferred block copolymers include the styrenic block copolymers such as styrene-butadiene-styrene (SBS), styrene-ethylene-butylene-styrene, (SEBS) and styrene-ethylene-propylene-styrene (SEPS). Commercial examples include SEPTON marketed by Kuraray Company of Kurashiki, Japan; TOPRENE by Kumho Petrochemical Co., Ltd and KRATON marketed by Kraton Polymers.

Also included are functionalized styrenic block copolymers, including those where the block copolymer incorporates a first polymer block having an aromatic vinyl compound, a second polymer block having a conjugated diene compound and a hydroxyl group located at a block copolymer, or its hydrogenation product. A preferred functionalized styrenic block copolymer is SEPTON HG-252.

The second blend component, Component B, is an acidic polymer that incorporates at least one type of an acidic functional group. Examples of such polymers suitable for use as include, but are not limited to, ethylene/(meth)acrylic acid copolymers and ethylene/(meth)acrylic acid/alkyl (meth)acrylate terpolymers, or ethylene and/or propylene maleic anhydride copolymers and terpolymers. Examples of such polymers which are commercially available include, but are not limited to, the Escor® 5000, 5001, 5020, 5050, 5070, 5100, 5110 and 5200 series of ethylene-acrylic acid copolymers sold by Exxon Mobil, the PRIMACOR® 1321, 1410, 1410-XT, 1420, 1430, 2912, 3150, 3330, 3340, 3440, 3460, 4311, 4608 and 5980 series of ethylene-acrylic acid copolymers sold by The Dow Chemical Company, Midland, Mich. and the ethylene-methacrylic acid copolymers such as Nucrel 599, 699, 0903, 0910, 925, 960, 2806, and 2906 commercially available from DuPont Also included are the so called bimodal ethylene/carboxylic acid copolymers as described in U.S. Pat. No. 6,562,906, the contents of which are incorporated herein by reference. These polymers comprise a first component comprising an ethylene/α,β-ethylenically unsaturated $C_{3-8}$ carboxylic acid high copolymer, particularly ethylene (meth)acrylic acid copolymers and ethylene, alkyl (meth)acrylate, (meth) acrylic acid terpolymers, having a weight average molecular weight, Mw, of about 80,000 to about 500,000, and a second component comprising an ethylene/α,β-ethylenically unsaturated $C_{3-8}$ carboxylic acid copolymers, particularly ethylene/(meth)acrylic acid copolymers having weight average molecular weight, Mw, of about 2,000 to about 30,000.

Component C is a base capable of neutralizing the acidic functional group of Component B and typically is a base having a metal cation. These metals are from groups IA, IB, IIA, IIB, IIIA, IIIB, IVA, IVB, VA, VB, VIA, VIB, VIIB and VIIIB of the periodic table. Examples of these metals include lithium, sodium, magnesium, aluminum, potassium, calcium, manganese, tungsten, titanium, iron, cobalt, nickel, hafnium, copper, zinc, barium, zirconium, and tin. Suitable metal compounds for use as a source of Component C are, for example, metal salts, preferably metal hydroxides, metal oxides, metal carbonates, metal acetates, metal stearates, metal laureates, metal oleates, metal palmitates and the like.

The MCBC composition preferably is prepared by mixing the above materials into each other thoroughly, either by using a dispersive mixing mechanism, a distributive mixing mechanism, or a combination of these. These mixing methods are well known in the manufacture of polymer blends. As a result of this mixing, the acidic functional group of Component B is dispersed evenly throughout the mixture in either their neutralized or non-neutralized state. Most preferably, Components A and B are melt-mixed together without Component C, with or without the premixing discussed above, to produce a melt-mixture of the two components. Then, Component C separately is mixed into the blend of Components A and B. This mixture is melt-mixed to produce the reaction product. This two-step mixing can be performed in a single process, such as, for example, an extrusion process using a proper barrel length or screw configuration, along with a multiple feeding system.

The metallic coagent-containing blend and the various other polymer compositions used to prepare core, mantle or outer cove layers of the golf balls may also incorporate one or more fillers. Such fillers are typically in a finely divided form, for example, in a size generally less than about 20 mesh, preferably less than about 100 mesh U.S. standard size, except for fibers and flock, which are generally elongated. Flock and fiber sizes should be small enough to facilitate processing. Filler particle size will depend upon desired effect, cost, ease of addition, and dusting considerations. The appropriate amounts of filler required will vary depending on the application but typically can be readily determined without undue experimentation.

The filler preferably is selected from the group consisting of precipitated hydrated silica, limestone, clay, talc, asbestos, barytes, glass fibers, aramid fibers, mica, calcium metasilicate, barium sulfate, zinc sulfide, lithopone, silicates, silicon carbide, diatomaceous earth, carbonates such as calcium or magnesium or barium carbonate, sulfates such as calcium or magnesium or barium sulfate, metals, including tungsten steel copper, cobalt or iron, metal alloys, tungsten carbide, metal oxides, metal stearates, and other particulate carbonaceous materials, and any and all combinations thereof. Preferred examples of fillers include metal oxides, such as zinc oxide and magnesium oxide. In another preferred embodiment the filler comprises a continuous or non-continuous fiber.

In another preferred embodiment the filler comprises one or more so called nanofillers, as described in U.S. Pat. No. 6,794,447 and copending U.S. Publication No. US2004-0092336 filed on Sep. 24, 2003 and U.S. Pat. No. 7,332,533 filed on Aug. 25, 2004, the entire contents of each of which are incorporated herein by reference. Examples of commercial nanofillers are various Cloisite grades including 10A, 15A, 20A, 25A, 30B, and NA+ of Southern Clay Products (Gonzales, Tex.) and the Nanomer grades including 1.24TL and C.30EVA of Nanocor, Inc. (Arlington Heights, Ill.).

Materials incorporating nanofiller materials can provide these property improvements at much lower densities than those incorporating conventional fillers. For example, a nylon-6 nanocomposite material manufactured by RTP Corporation of Wichita, Kans. uses a 3% to 5% clay loading and has a tensile strength of 11,800 psi and a specific gravity of 1.14, while a conventional 30% mineral-filled material has a tensile strength of 8,000 psi and a specific gravity of 1.36. Because use of nanocomposite materials with lower loadings of inorganic materials than conventional fillers provides the same properties, this use allows products to be lighter than those with conventional fillers, while maintaining those same properties.

As used herein, a "nanocomposite" is defined as a polymer matrix having nanofiller intercalated or exfoliated within the matrix. Physical properties of the polymer will change with the addition of nanofiller and the physical properties of the polymer are expected to improve even more as the nanofiller is dispersed into the polymer matrix to form a nanocomposite.

Nanocomposite materials are materials incorporating from about 0.1% to about 20%, preferably from about 0.1% to about 15%, and most preferably from about 0.1% to about 10% of nanofiller reacted into and substantially dispersed through intercalation or exfoliation into the structure of an organic material, such as a polymer, to provide strength, temperature resistance, and other property improvements to the resulting composite. Descriptions of particular nanocomposite materials and their manufacture can be found in U.S. Pat. No. 5,962,553 to Ellsworth, U.S. Pat. No. 5,385,776 to Maxfield et al., and 4,894,411 to Okada et al. Examples of nanocomposite materials currently marketed include M1030D, manufactured by Unitika Limited, of Osaka, Japan, and 1015C2, manufactured by UBE America of New York, N.Y.

Preferably the nanofiller material is added to the polymeric composition in an amount of from about 0.1% to about 20%, preferably from about 0.1% to about 15%, and most preferably from about 0.1% to about 10% by weight of nanofiller reacted into and substantially dispersed through intercalation or exfoliation into the structure of the polymeric composition.

If desired, the various polymer compositions used to prepare the golf balls can additionally contain other additives such as plasticizers, pigments, antioxidants, U.V. absorbers, optical brighteners, or any other additives generally employed in plastics formulation or the preparation of golf balls.

Another particularly well-suited additive for use in the presently disclosed compositions includes compounds having the general formula:

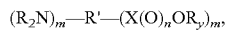
$(R_2N)_m—R'—(X(O)_nOR_y)_m$, where R is hydrogen, or a $C_1$-$C_{20}$ aliphatic, cycloaliphatic or aromatic systems; R' is a bridging group comprising one or more $C_1$-$C_{20}$ straight chain or branched aliphatic or alicyclic groups, or substituted straight chain or branched aliphatic or alicyclic groups, or aromatic group, or an oligomer of up to 12 repeating units including, but not limited to, polypeptides derived from an amino acid sequence of up to 12 amino acids; and X is C or S or P with the proviso that when X=C, n=1 and y=1 and when X=S, n=2 and y=1, and when X=P, n=2 and y=2. Also, m=1-3. These materials are more fully described in copending U.S. Provisional Patent Application No. 60/588,603, filed on Jul. 16, 2004, the entire contents of which are herein incorporated by reference. These materials include caprolactam, oenantholactam, decanolactam, undecanolactam, dodecanolactam, caproic 6-amino acid, 11-aminoundecanoicacid, 12-aminododecanoic acid, diamine hexamethylene salts of adipic acid, azeleic acid, sebacic acid and 1,12-dodecanoic acid and the diamine nonamethylene salt of adipic acid, 2-aminocinnamic acid, L-aspartic acid, 5-aminosalicylic acid, aminobutyric acid; aminocaproic acid; aminocapyryic acid; 1-(aminocarbonyl)-1-cyclopropanecarboxylic acid; aminocephalosporanic acid; aminobenzoic acid; aminochlorobenzoic acid; 2-(3-amino-4-chlorobenzoyl)benzoic acid; aminonaphtoic acid; aminonicotinic acid; aminonorbornanecarboxylic acid; aminoorotic acid; aminopenicillanic acid; aminopentenoic acid; (aminophenyl)butyric acid; aminophenyl propionic acid; aminophthalic acid; aminofolic acid; aminopyrazine carboxylic acid; aminopyrazole carboxylic acid; aminosalicylic acid; aminoterephthalic acid; aminovaleric acid; ammonium hydrogencitrate; anthranillic acid; aminobenzophenone carboxylic acid; aminosuccinamic acid, epsilon-caprolactam; omega-caprolactam, (carbamoylphenoxy)acetic acid, sodium salt; carbobenzyloxy aspartic acid; carbobenzyl glutamine; carbobenzyloxyglycine; 2-aminoethyl hydrogensulfate; aminonaphthalenesulfonic acid; aminotoluene sulfonic acid; 4,4'-methylene-bis-(cyclohexylamine)carbamate and ammonium carbamate.

Most preferably the material is selected from the group consisting of 4,4'-methylene-bis-(cyclohexylamine)carbamate (commercially available from R.T. Vanderbilt Co., Norwalk, Conn. under the tradename Diak® 4), 11-aminoundecanoicacid, 12-aminododecanoic acid, epsilon-caprolactam; omega-caprolactam, and any and all combinations thereof.

In an especially preferred embodiment a nanofiller additive component in the golf ball is surface modified with a compatibilizing agent comprising the earlier described compounds having the general formula:

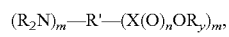
$(R_2N)_m—R'—(X(O)_nOR_y)_m$,

A most preferred embodiment would be a filler comprising a nanofiller clay material surface modified with an amino acid including 12-aminododecanoic acid. Such fillers are available from Nanonocor Co. under the tradename Nanomer 1.24TL.

Disclosed compositions have sufficient shear-cut resistance and excellent mechanical properties that make them suitable for making sports equipment, such as a recreation ball, a golf club or component thereof, such as a grip, shoes, glove, helmet, protective gears, bicycle, football, soccer, basketball, baseball, volley ball, hockey, ski, skate and the like.

The cores of the golf balls may include the traditional rubber components used in golf ball applications including, both natural and synthetic rubbers, such as cis-1,4-polybutadiene, trans-1,4-polybutadiene, 1,2-polybutadiene, cis-polyisoprene, trans-polyisoprene, polychloroprene, polybutylene, styrene-butadiene rubber, styrene-butadiene-styrene block copolymer and partially and fully hydrogenated equivalents, styrene-isoprene-styrene block copolymer and partially and fully hydrogenated equivalents, nitrile rubber, silicone rubber, and polyurethane, as well as mixtures of these. Polybutadiene rubbers, especially 1,4-polybutadiene rubbers containing at least 40 mol %, and more preferably 80 to 100 mol % of cis-1,4 bonds, are preferred because of their high rebound resilience, moldability, and high strength after vulcanization. The polybutadiene component may be synthesized by using rare earth-based catalysts, nickel-based catalysts, or cobalt-based catalysts, conventionally used in this field. Polybutadiene obtained by using lanthanum rare earth-based catalysts usually employ a combination of a lanthanum rare earth (atomic number of 57 to 71)-compound, but particularly preferred is a neodymium compound.

The 1,4-polybutadiene rubbers have a molecular weight distribution (Mw/Mn) of from about 1.2 to about 4.0, preferably from about 1.7 to about 3.7, even more preferably from about 2.0 to about 3.5, most preferably from about 2.2 to about 3.2. The polybutadiene rubbers have a Mooney viscosity ($ML_{1+4}$ (100° C.)) of from about 20 to about 80, preferably from about 30 to about 70, even more preferably from about 30 to about 60, most preferably from about 35 to about 50. The term "Mooney viscosity" used herein refers in each case to an industrial index of viscosity as measured with a Mooney viscometer, which is a type of rotary plastometer (see JIS K6300). This value is represented by the symbol $ML_{1+4}$ (100° C.), wherein "M" stands for Mooney viscosity, "L" stands for large rotor (L-type), "1+4" stands for a pre-heating time of 1 minute and a rotor rotation time of 4 minutes, and "100° C." indicates that measurement was carried out at a temperature of 100° C. As readily appreciated by one skilled in the art, blends of polybutadiene rubbers may also be utilized in the golf balls of the present invention, such blends may be prepared with any mixture of rare earth-based catalysts, nickel-based catalysts, or cobalt-based catalysts derived materials, and from materials having different molecular weights, molecular weight distributions and Mooney viscosity.

The cores of the golf balls may also include 1,2-polybutadienes having differing tacticity, all of which are suitable as unsaturated polymers for use in the presently disclosed compositions, are atactic 1,2-polybutadiene, isotactic 1,2-polybutadiene, and syndiotactic 1,2-polybutadiene. Syndiotactic 1,2-polybutadiene having crystallinity suitable for use as an unsaturated polymer in the presently disclosed compositions are polymerized from a 1,2-addition of butadiene. The presently disclosed golf balls may include syndiotactic 1,2-polybutadiene having crystallinity and greater than about 70% of 1,2-bonds, more preferably greater than about 80% of 1,2-bonds, and most preferably greater than about 90% of 1,2-bonds. Also, the 1,2-polybutadiene may have a mean molecular weight between about 10,000 and about 350,000, more preferably between about 50,000 and about 300,000, more preferably between about 80,000 and about 200,000, and most preferably between about 10,000 and about 150,000. Examples of suitable syndiotactic 1,2-polybutadienes having crystallinity suitable for use in golf balls are sold under the trade names RB810, RB820, and RB830 by JSR Corporation of Tokyo, Japan.

The cores of the golf balls of the present invention may also include the polyalkenamer rubbers as previously described herein and disclosed in U.S. Pat. No. 7,528,196 in the name of Hyun Kim et al., the entire contents of which are hereby incorporated by reference.

Typically the golf ball core is made by mixing together the unsaturated polymer, cross-linking agents, and other additives with or without melting them. Dry blending equipment, such as a tumbler mixer, V blender, ribbon blender, or two-roll mill, can be used to mix the compositions. The golf ball core compositions can also be mixed using a mill, internal mixer such as a Banbury or Farrel continuous mixer, extruder or combinations of these, with or without application of thermal energy to produce melting. The various core components can be mixed together with the cross-linking agents, or each additive can be added in an appropriate sequence to the milled unsaturated polymer. In another method of manufacture the cross-linking agents and other components can be added to the unsaturated polymer as part of a concentrate using dry blending, roll milling, or melt mixing. If radiation is a cross-linking agent, then the mixture comprising the unsaturated polymer and other additives can be irradiated following mixing, during forming into a part such as the core of a ball, or after forming.

The resulting mixture can be subjected to, for example, a compression or injection molding process, to obtain solid spheres for the core. The polymer mixture is subjected to a molding cycle in which heat and pressure are applied while the mixture is confined within a mold. The cavity shape depends on the portion of the golf ball being formed. The compression and heat liberates free radicals by decomposing one or more peroxides, which initiate cross-linking. The temperature and duration of the molding cycle are selected based upon the type of peroxide and peptizer selected. The molding cycle may have a single step of molding the mixture at a single temperature for fixed time duration.

For example, a preferred mode of preparation for the cores used in the present invention is to first mix the core ingredients on a two-roll mill, to form slugs of approximately 30-40 g, and then compression-mold in a single step at a temperature between 150 to 180° C., for a time duration between 5 and 12 minutes.

The various core components may also be combined to form a golf ball by an injection molding process, which is also well known to one of ordinary skill in the art. The curing time depends on the various materials selected, and those of ordinary skill in the art will be readily able to adjust the curing time upward or downward based on the particular materials used and the discussion herein.

The various formulations for the intermediate layer and/or cover layer may be produced by any generally known method, such as dry blending, melt-mixing, or combination of those, to achieve a good dispersive mixing, distributive mixing, or both. Examples of melt-mixing are roll-mill; internal mixer, such as injection molding, single-screw extruder, twin-screw extruder; or any combination of those. The feed to the injection mold may be blended manually or mechanically prior to the addition to the injection molder feed hopper. Finished golf balls may be prepared by initially positioning the solid, preformed core in an injection-molding cavity, followed by uniform injection of the intermediate layer and/or cover layer composition sequentially over the core. The cover formulations can be injection molded around the cores to produce golf balls of the required diameter.

Alternatively, the intermediate layers and/or outer cover layer may also be formed around the core by first forming half shells by injection molding followed by compression molding the half shells about the core to form the final ball.

The intermediate layers and/or outer cover layer may also be formed around the cores using compression molding. Cover materials for compression molding may also be extruded or blended resins or castable resins such as thermoset polyurethane or thermoset polyurea.

The golf ball of the present invention comprises a core and may comprise from 0 to 6, preferably from 0 to 5, more preferably from about 1 to about 4, most preferably from about 1 to about 3 intermediate or mantle layer(s).

In one preferred aspect, the golf ball is a three-piece ball with the metallic coagent-containing blend composition used in the intermediate layer.

In one preferred aspect, the golf ball is a three-piece ball with the metallic coagent-containing blend composition used in the cover layer.

In one preferred aspect, the golf ball is a four-piece, five-piece, or six-piece ball having at least one intermediate layer which comprises the metallic coagent-containing blend material described herein.

In one preferred aspect, the golf ball is a four-piece, five-piece, or six-piece ball wherein the cover layer comprises the metallic coagent-containing blend material described herein.

In another aspect the golf ball is a three-piece ball with the intermediate layer comprising the metallic coagent-containing blend material and the outer cover layer comprises a block copolymer, an acidic polymer, a unimodal ionomer, a bimodal ionomer, a modified unimodal ionomer, a modified bimodal ionomer, a polyalkenamer, a polyamide, a thermoplastic or thermoset polyurethane or thermoplastic or thermoset polyurea, or a multicomponent blend composition ("MCBC"), the MCBC comprising (A) a block copolymer; and (B) one or more acidic polymers; and (C) one or more basic metal salts present in an amount to neutralize at greater than or equal to about 30 percent of the acid groups of Component (B), and any and all combinations thereof.

In another aspect the golf ball is a four-piece ball with a unitary core and one or both of the intermediate layers comprises the metallic coagent-containing blend material and the outer cover layer comprises a block copolymer, an acidic polymer, a unimodal ionomer, a bimodal ionomer, a modified unimodal ionomer, a modified bimodal ionomer, a polyalkenamer, a polyamide, a thermoplastic or thermoset polyurethane or thermoplastic or thermoset polyurea, or a multicomponent blend composition ("MCBC"), the MCBC comprising (A) a block copolymer; and (B) one or more acidic polymers; and (C) one or more basic metal salts present in an amount to neutralize at greater than or equal to about 30 percent of the acid groups of Component (B), and any and all combinations thereof.

In another aspect the golf ball is a five-piece ball with a unitary core and one or more of the three intermediate layers comprises the metallic coagent-containing blend material and the outer cover layer comprises a block copolymer, an acidic polymer, a unimodal ionomer, a bimodal ionomer, a modified unimodal ionomer, a modified bimodal ionomer, a polyalkenamer, a polyamide, a thermoplastic or thermoset polyurethane or thermoplastic or thermoset polyurea, or a multicomponent blend composition ("MCBC"), the MCBC comprising (A) a block copolymer; and (B) one or more acidic polymers; and (C) one or more basic metal salts present in an amount to neutralize at greater than or equal to about 30 percent of the acid groups of Component (B), and any and all combinations thereof.

In another aspect the golf ball is a six-piece ball with a unitary core and the one or more of the four intermediate layers comprises the metallic coagent-containing blend material and the outer cover layer comprises a block copolymer, an acidic polymer, a unimodal ionomer, a bimodal ionomer, a modified unimodal ionomer, a modified bimodal ionomer, a polyalkenamer, a polyamide, a thermoplastic or thermoset polyurethane or thermoplastic or thermoset polyurea, or a multicomponent blend composition ("MCBC"), the MCBC comprising (A) a block copolymer; and (B) one or more acidic polymers; and (C) one or more basic metal salts present in an amount to neutralize at greater than or equal to about 30 percent of the acid groups of Component (B), and any and all combinations thereof.

The one or more intermediate layers of the golf balls may have a thickness of from about 0.010 to about 0.400, preferably from about 0.020 to about 0.200 and most preferably from about 0.030 to about 0.100 inches.

The one or more intermediate layers of the golf balls may also have a Shore D hardness as measured on the ball of greater than about 25, preferably greater than about 40, and most preferably greater than about 50 Shore D units.

The outer cover layer of the balls may have a thickness of from about 0.015 to about 0.100, preferably from about 0.020 to about 0.080, more preferably from about 0.025 to about 0.060 inches.

The outer cover layer the balls may also have a Shore D hardness as measured on the ball of from about 30 to about 75, preferably from 38 to about 68 and most preferably from about 40 to about 65.

The core of the balls also may have a PGA compression of less than about 140, preferably less than about 100, and most preferably less than about 90.

The various core layers (including the center) if present may each exhibit a different hardness. The difference between the center hardness and that of the next adjacent layer, as well as the difference in hardness between the various core layers may be greater than 2, preferably greater than 5, most preferably greater than 10 units of Shore D.

In one preferred aspect, the hardness of the center and each sequential layer increases progressively outwards from the center to outer core layer.

In another preferred aspect, the hardness of the center and each sequential layer decreases progressively inwards from the outer core layer to the center.

The core of the balls may have a diameter of from about 0.5 to about 1.62, preferably from about 0.7 to about 1.60, more preferably from about 0.9 to about 1.58, yet more preferably from about 1.20 to about 1.54, and even more preferably from about 1.40 to about 1.50 in.

More specifically, for a three piece golf ball consisting of a core, a mantle, and a cover, the diameter of the core is most preferably greater than or equal to 1.41 inches in diameter.

More specifically, for a four piece golf ball (consisting of a core, an inner mantle, an outer mantle, and a cover wherein the inner mantle is encased by an outer mantle) the diameter of the core is most preferably greater than or equal to 1.00 inches in diameter.

More specifically, for a five piece golf ball (consisting of an inner core, an outer core, an inner mantle, an outer mantle, and a cover wherein the inner core and inner mantle are encased by outer core and outer mantle, respectively) the diameter of the core is most preferably greater than or equal to 1.00 inches in diameter.

More specifically, for a six piece golf ball (consisting of an inner core, an intermediate core, an outer core, an inner mantle, an outer mantle, and a cover wherein the intermediate core and inner mantle are encased by outer core and outer mantle, respectively) the diameter of the core is most preferably greater than or equal to 1.00 inches in diameter.

More specifically, for a six piece golf ball (consisting of an inner core, an outer core, an inner mantle, an intermediate mantle, an outer mantle, and a cover wherein the intermediate core and inner mantle are encased by outer core and outer mantle, respectively) the diameter of the core is most preferably greater than or equal to 1.00 inches in diameter.

The COR of the golf balls may be greater than about 0.700, preferably greater than about 0.730, more preferably greater than 0.750, most preferably greater than 0.775, and especially greater than 0.800 at 125 ft/sec inbound velocity.

The shear cut resistance of the golf balls of the present invention is less than about 4, preferably less than about 3, even more preferably less than about 2.

In view of the many possible embodiments to which the principles of the disclosed invention may be applied, it should be recognized that the illustrated embodiments are only preferred examples of the invention and should not be taken as limiting the scope of the invention.

What is claimed is:

1. A golf ball comprising:
   (a) a core:
   (b) an outer cover layer; and
   (c) at least one intermediate layer having a thickness of 0.030 inches to 0.400 inches,
   wherein the intermediate layer comprises an ionomer made by blending:
   (i) a metallic coagent, wherein the metallic coagent is a metal cinnamate; and
   (ii) at least one polyolefin.

2. The golf ball of claim 1, wherein the metal is selected from zinc, calcium, magnesium, cobalt, tin, cerium, lanthanum, aluminum, vanadium, manganese, copper, nickel, iron, titanium, zirconium, chromium, scandium, strontium, barium, or bismuth.

3. The golf ball of claim 1, wherein the metallic coagent is zinc cinnamate.

4. The golf ball of claim 1, wherein the polyolefin is selected from polyethylene, polypropylene, polybutene, polystyrene, ethylene-propylene rubber, polybutene-1, polyisobutylene, cyclopolyolefin, polyisoprene or poly-α-olefin.

5. The golf ball of claim 1, wherein the polyolefin is selected from polyethylene or polypropylene.

6. The golf ball of claim 1, wherein the amount of the metallic coagent is at least 1wt %, based on the total weight of the blend composition.

7. The golf ball of claim 1, wherein the amount of metallic coagent blended is not greater than 40wt %, based on the total weight of the blend composition.

8. The golf ball of claim 6, wherein the metallic coagent is zinc cinnamate.

9. The golf ball of claim 1, wherein the amount of the metallic coagent is 3 to 20 wt %, based on the total weight of the blend composition.

10. The golf ball of claim 5, wherein the metallic coagent is zinc cinnamate.

11. The golf ball of claim 10, wherein the amount of the metallic coagent is 3 to 20 wt %, based on the total weight of the blend composition.

12. The golf ball of claim 1, wherein the intermediate layer has a thickness of 0.030 inches to 0.100 inches.

13. The golf ball of claim 11, wherein the intermediate layer has a thickness of 0.030 inches to 0.100 inches.

14. The golf ball of claim 1, wherein the outer cover layer comprises a thermoset polyurethane or a thermoset polyurea.

15. The golf ball of claim 11, wherein the outer cover layer comprises a thermoset polyurethane or a thermoset polyurea.

* * * * *